United States Patent
Lee et al.

(10) Patent No.: US 9,503,169 B1
(45) Date of Patent: Nov. 22, 2016

(54) METHOD FOR GENERATING CODEBOOK IN MULTIPLE INPUT MULTIPLE OUTPUT WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Kilbom Lee, Seoul (KR); Hyunsu Cha, Seoul (KR); Dongku Kim, Seoul (KR); Jiwon Kang, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/924,494

(22) Filed: Oct. 27, 2015

(30) Foreign Application Priority Data

Sep. 14, 2015 (KR) .......................... 10-2015-0129630

(51) Int. Cl.
- *H04B 7/02* (2006.01)
- *H04B 7/04* (2006.01)
- *H04L 5/00* (2006.01)
- *H04B 7/06* (2006.01)

(52) U.S. Cl.
CPC ............ *H04B 7/046* (2013.01); *H04B 7/0417* (2013.01); *H04B 7/063* (2013.01); *H04L 5/0026* (2013.01); *H04B 7/02* (2013.01)

(58) Field of Classification Search
CPC ......... H04B 7/02; H04B 7/06; H04L 1/0001; H04L 25/03898
See application file for complete search history.

(56) References Cited

U.S. PATENT DOCUMENTS

| | | | | |
|---|---|---|---|---|
| 9,059,761 | B2* | 6/2015 | Seo ...................... | H04B 7/0617 |
| 2004/0204104 | A1* | 10/2004 | Horng .................. | H04B 7/0669 |
| | | | | 455/562.1 |
| 2010/0322343 | A1* | 12/2010 | Yeon .................... | H04B 7/0447 |
| | | | | 375/295 |
| 2014/0169408 | A1* | 6/2014 | Bayesteh ............. | H04B 7/0473 |
| | | | | 375/144 |
| 2015/0351091 | A1* | 12/2015 | Yang .................... | H04B 7/2643 |
| | | | | 370/329 |

\* cited by examiner

*Primary Examiner* — Jean B Corrielus
(74) *Attorney, Agent, or Firm* — Lee, Hong, Degerman, Kang & Waimey

(57) ABSTRACT

A method for transmitting a signal to a receiver by a transmitter in a multiple input multiple output (MIMO) wireless communication system is disclosed. A method for transmitting a signal to a receiver by a transmitter in a multiple input multiple output (MIMO) wireless communication system includes: generating at least one bit stream by channel-coding data; allocating a first bit stream having a specific size from among the bit streams to an antenna sequence codeword according to an antenna sequence codebook; and transmitting the remaining second bit stream from among the bit streams to the receiver according to the order of antenna pairs indicated by the allocated antenna sequence codeword, wherein the antenna sequence codebook indicates a mapping relationship between the first bit stream and the antenna sequence codeword, and the antenna sequence codeword is defined by two timeslots and two antenna indexes.

5 Claims, 5 Drawing Sheets generating at least two bit streams by channel-coding data (S501)

allocating a first bit stream having a specific size from among the bit streams to an antenna sequence codeword (S503)

transmitting the remaining second bit stream from among the bit streams to the receiver (S505)

-- Prior Art --

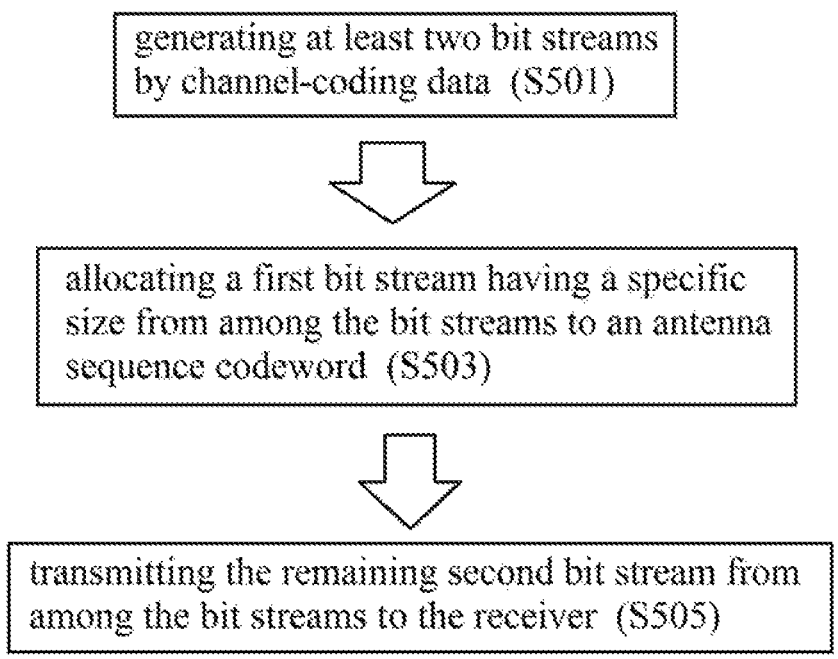

METHOD FOR GENERATING CODEBOOK IN MULTIPLE INPUT MULTIPLE OUTPUT WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Patent Application No. 10-2015-0129630, filed on Sep. 14, 2015, the contents of which are hereby incorporated by reference herein in its entirety.

BACKGROUND OF THE INVENTION

Field of the Invention

The present invention relates to a wireless communication system, and more particularly to a method for generating a codebook in a multiple input multiple output (MIMO) wireless communication system.

Discussion of the Related Art

The present invention relates to the STBC-SSC (space time block code-spatial sequence coding) scheme for use in the open loop MIMO (multiple input multiple output) system. When RF data is transmitted and received using the Alamouti STBC scheme, a user equipment (UE) may apply a conjugate complex number to the data symbol received at an even time point (or at an odd time point), and may store the resultant value therein. The above operation is a UE operation corresponding to the Alamouti codeword by which the row/column vectors of the effective channel matrix are perpendicular to each other. When considering the UE operation, the number of antenna index sequences (hereinafter referred to as "sequences") capable of being constructed by the conventional STBC-SSC scheme is reduced, so that advantages of the STBC-SSC scheme may be deteriorated. In addition, if the number of sequence decoding errors increases even when many sequences can be constructed, the number of Tx symbol errors may also increase, such that it may be difficult to actually utilize many sequences.

In order to address the above-mentioned issue, the present invention provides a method for generating the sequence more effectively than the legacy STBC-SSC scheme in consideration of the above UE operation. In addition, the present invention provides a method for designing a sequence codebook to reduce the probability of error generation between the sequences in such a manner that data can be loaded on the resultant sequence.

Prior to describing the present invention, the SM scheme and the STBC-SM scheme will hereinafter be described in detail.

In addition, the present invention modifies a codeword matrix for use in GBD-QOSTBC (Generalized block diagonal quasi-orthogonal space time block code) so that it defines a sequence (composed of an antenna index) capable of being identified by a user equipment (UE) in different ways. GBD-QOSTBC will hereinafter be described in detail.

Assuming that the number of Tx antennas is denoted by $M_T$, the $(M_T \times M_T)$-sized GBD-QOSTBC codeword matrix is constructed. The Alamouti codeword corresponding to $M_T=2$ is defined as the matrix $A(s_i,s_j)$ as shown in the following Table 1. The symbols $s_i, s_j$ may be complex symbols (i.e., $s_i, s_j \in \Psi$) over signal constellation ($\Psi$).

$$A(s_i, s_j) = \begin{bmatrix} s_i & s_j \\ -s_j^* & s_i^* \end{bmatrix} \quad \text{[Equation 1]}$$

(where, $i \in \{1, 3, \ldots 2k-1\}$,
$j \in \{2, 4, \ldots 2k\}, k = M_T/2$)

In the environment ($M_T=4$) based on Equation 1, the QO-STBC code is represented by the ABBA code as shown in the following equation 2.

$$\begin{bmatrix} A & B \\ B & A \end{bmatrix} = \begin{bmatrix} s_1 & s_2 & s_3 & s_4 \\ -s_2^* & s_1^* & -s_4^* & s_3^* \\ s_3 & s_4 & s_1 & s_2 \\ -s_4^* & s_3^* & -s_2^* & s_1^* \end{bmatrix} \quad \text{[Equation 2]}$$

In Equation 2, a diversity gain capable of being obtained using the ABBA code is still maintained at the value of 2. Therefore, a phase rotation of the $(s_3, s_4)$ symbol is needed to obtain the diversity gain of 4 corresponding to the number of Tx antennas. The phase-rotated QO-STBC codeword matrix may be defined as shown in the following equation 3.

$$C_4 = \begin{bmatrix} s_1 & s_2 & \tilde{s}_3 & \tilde{s}_4 \\ -s_2^* & s_1^* & -\tilde{s}_4^* & \tilde{s}_3^* \\ \tilde{s}_3 & \tilde{s}_4 & s_1 & s_2 \\ -\tilde{s}_4^* & \tilde{s}_3^* & -s_2^* & s_1^* \end{bmatrix} = \begin{bmatrix} A(s_1, s_2) & A(\tilde{s}_3, \tilde{s}_4) \\ A(\tilde{s}_3, \tilde{s}_4) & A(s_1, s_2) \end{bmatrix} \quad \text{[Equation 3]}$$

In Equations 2 and 3, $s_1, s_2, s_3, s_4 \in \Psi$ may be used, and $\tilde{s}_3, \tilde{s}_4 \in e^{j\theta_1}\Psi$ (where, $\tilde{s}_3 = s_3 \cdot e^{j\theta_1}, \tilde{s}_4 = s_4 \cdot e^{j\theta_1}$) may be used. Specifically, in order to modify the Q-OSTBC matrix shown in Equation 3 into a block diagonal matrix (GBD-QOSTBC), a symbol corresponding to an odd index and a symbol corresponding to an even index are defined in different ways in association with the symbols $(s_1, s_2 \in \Psi, \tilde{s}_3, \tilde{s}_4 \in e^{j\theta_1}\Psi)$ located over the signal constellation. That is, the odd index symbol may be defined as $s_{odd} = [s_1 \ s_3 \ \ldots \ s_{2k-1}]^T$, and the even index symbol may be defined as $s_{even} = [s_2 \ s_4 \ \ldots \ s_{2k}]^T$.

The following linear operation is applied to the above symbols, so that new symbols may be defined as shown in Equation 4.

$$[S_1 S_3 \ldots S_{2k-1}]^T = TDs_{odd}$$

$$[S_2 S_4 \ldots S_{2k}]^T = TDs_{even} \quad \text{[Equation 4]}$$

In order to discriminate the signal constellation of the newly defined symbols shown in Equation 4, $\Gamma$ may be defined. In other words, the symbol of Equation 4 may be defined as $S_i \in \Gamma$.

In Equation 4, 2k symbols may be classified into two sets (or two aggregates) according to the odd and even indexes. In this case, the (k×k) matrix T may be a random Hadamard matrix. A phase rotation matrix D for acquiring a maximum diversity gain may be represented by the following equation 5.

$$D = \begin{bmatrix} e^{j\theta_0} & & & \\ & e^{j\theta_1} & & \\ & & \ddots & \\ & & & e^{j\theta_{k-1}} \end{bmatrix} \quad \text{[Equation 5]}$$

Assuming that the Hadamard matrix $$T = \begin{bmatrix} 1 & 1 \\ 1 & -1 \end{bmatrix}$$

shown in Equation 4 is used, the equation 3 may be re-defined as a block diagonal matrix as shown in the following equation 6.

$$\hat{C}_4 = \begin{bmatrix} A(s_1+\tilde{s}_3, s_2+\tilde{s}_4) & 0 \\ 0 & A(s_1-\tilde{s}_3, s_2-\tilde{s}_4) \end{bmatrix} = \quad \text{[Equation 6]}$$

$$\begin{bmatrix} S_1 & S_2 & & \\ -S_2^* & S_1^* & & \\ & & S_3 & S_4 \\ & & -S_4^* & S_3^* \end{bmatrix}$$

In Equations 4 and 6, the symbols $(s_1, s_2)$ may be symbols located over the original signal constellation $\Psi$ in which no phase rotation occurs, such that $\theta_0=0$ of the matrix D may be decided. In addition, although the conventional QO-STBC codeword matrix ($C_4$) shown in Equation 3 is different from the GBD-QOSTBC codeword matrix ($\hat{C}_4$) shown in Equation 6, the conventional QO-STBC codeword matrix ($C_4$) and the GBD-QOSTBC codeword matrix ($\hat{C}_4$) may have the same average BER performance.

In another example of GBD-QOSTBC, the codeword matrix ($C_8$) corresponding to $M_T=8$ may be used. In association with a total of 8 Tx symbols, two symbols are combined into one pair, and symbols of different pairs may belong to the signal constellation having rotated in different phases as shown in the following equation 7.

$$s_1, s_2 \epsilon e^{j\theta_0}\Psi, \tilde{s}_3, \tilde{s}_4 \epsilon e^{j\theta_1}\Psi, \bar{s}_5, \bar{s}_6 \epsilon e^{j\theta_2}\Psi, \hat{s}_7, \hat{s}_8 \epsilon e^{j\theta_3}\Psi \quad \text{[Equation 7]}$$

In Equation 7, $\theta_0=0$ may be decided. The phase may be determined according to the number of antennas and the modulation order of Tx symbols. Assuming that $M_T=8$ is decided and the BPSK symbol is transmitted, $$\theta_1 = \frac{\pi}{4}, \theta_2 = \frac{2\pi}{4}, \theta_3 = \frac{3\pi}{4}$$

may be used. The random Hadamard matrix (T) shown in FIG. 4 may be assumed as shown in the following equation 8.

$$T = \begin{bmatrix} 1 & -1 & 1 & -1 \\ 1 & 1 & -1 & -1 \\ -1 & 1 & 1 & -1 \\ 1 & 1 & 1 & 1 \end{bmatrix} \quad \text{[Equation 8]}$$

In addition, the codeword matrix ($C_8$) may be represented as shown in the following equation 9.

$$C_8 = \begin{bmatrix} A_1 & & & \\ & A_2 & & \\ & & A_3 & \\ & & & A_4 \end{bmatrix} = \quad \text{[Equation 9]}$$

$$\begin{bmatrix} S_1 & S_2 & & & & & & \\ -S_2^* & S_1^* & & & & & & \\ & & S_3 & S_4 & & & & \\ & & -S_4^* & S_3^* & & & & \\ & & & & S_5 & S_6 & & \\ & & & & -S_6^* & S_5^* & & \\ & & & & & & S_7 & S_8 \\ & & & & & & -S_8^* & S_7^* \end{bmatrix}$$

$A_1 = A(s_1 - \tilde{s}_3 + \bar{s}_5 - \hat{s}_7, s_2 - \tilde{s}_4 + \bar{s}_6 - \hat{s}_8) = A(S_1, S_2)$ $A_2 = A(s_1 + \tilde{s}_3 - \bar{s}_5 - \hat{s}_7, s_2 + \tilde{s}_4 - \bar{s}_6 - \hat{s}_8) = A(S_3, S_4)$ $A_3 = A(-s_1 + \tilde{s}_3 + \bar{s}_5 - \hat{s}_7, -s_2 + \tilde{s}_4 + \bar{s}_6 - \hat{s}_8) = A(S_5, S_6)$ $A_4 = A(s_1 + \tilde{s}_3 + \bar{s}_5 + \hat{s}_7, s_2 + \tilde{s}_4 + \bar{s}_6 + \hat{s}_8) = A(S_7, S_7)$ The matrix $A(s_i, s_j)$ is defined in Equation 1. Assuming that $M_T=2k=2^r$ is decided at a random condition denoted by $r \geq 2$, the GBD-QOSTBC matrix may be generalized as shown in the following 10.

$$C_{2k} = \begin{bmatrix} A(S_1, S_2) & & & \\ & A(S_3, S_4) & & \\ & & \ddots & \\ & & & A(S_{2k-1}, S_{2k}) \end{bmatrix} \quad \text{[Equation 10]}$$

In the codeword matrix shown in Equation 10, a horizontal axis may denote an antenna index, and a vertical index may denote a timeslot index. In the case of $M_T=6$ in which the number of Tx antennas is not denoted by $M_T=2k=2^r$, the GBD-QOSTBC codeword matrix may be constructed in association with $M_T=8$. Then, if the last two rows and the last two columns are deleted, the codeword for $M_T=6$ may be constructed.

The SM scheme will hereinafter be described in detail.

In accordance with the SM scheme, binary data is allocated to each Tx antenna index, an antenna corresponding to a bit stream to be transmitted is selected, and the data stream can be transmitted. That is, total amount of information to be transmitted may be the sum of the amount of information allocated to the data stream and the amount of information allocated to the antenna index.

FIG. 1 is a conceptual diagram illustrating the SM scheme. Referring to FIG. 1, it can be recognized that total amount of information to be transmitted is identical to the sum of the amount of information owned by the Tx symbol and the amount of information allocated to the antenna index used to transmit the Tx symbol information.

In more detail, assuming that the number of Tx antennas is $M_T$, a maximum of $\log_2 M_T$ bits may be allocated to the Tx antenna index. Assuming that the PSK or QAM symbol having the modulation order of M is used, total amount (m) of information capable of being transmitted using the SM scheme may be defined as $m=\log_2(M_T)+\log_2(M)$. That is, the total amount (m) of information capable of being represented by bits per channel use may be defined as $m=\log_2(M_T)+\log_2(M)$.

For example, assuming that 3 bits are transmitted per channel use, when the number of Tx antennas is set to 2 and the modulation order is set to 4, the SM scheme may be used as shown in the following Table 1. In Table 1, $M_T=N_t$ is set, the number of antennas is an antenna index, and the Tx symbol is an M-PSK or M-QAM symbol.

TABLE 1

| Input bits | $N_t = 2, M = 4$ | | $N_t = 4, M = 2$ | |
| --- | --- | --- | --- | --- |
| | Antenna number | Transmit symbol | Antenna number | Transmit symbol |
| 000 | 1 | +1+j | 1 | −1 |
| 001 | 1 | −1+j | 1 | +1 |
| 010 | 1 | −1−j | 2 | −1 |
| 011 | 1 | +1−j | 2 | +1 |
| 100 | 2 | +1+j | 3 | −1 |
| 101 | 2 | −1+j | 3 | +1 |
| 110 | 2 | −1−j | 4 | −1 |
| 111 | 2 | +1−j | 4 | +1 |

The STBC-SM scheme will hereinafter be described in detail.

It is assumed that the (L×L) STBC codeword is based on L Tx antennas from among a total number ($M_T$) of Tx antennas. Whereas the SM scheme allocates the bit stream to each antenna index, L selected antennas must be continuously used during a timeslot of the STBC codeword length (L) when data is transmitted according to the STBC-SM scheme.

The amount of information (represented by the number of bits per channel use) capable of being loaded on the antenna index and then transmitted may be denoted by $$\frac{1}{L}\left\lfloor \log_2 \binom{M_T}{L} \right\rfloor.$$

Therefore, the total amount (m) of information, which is loaded on the Tx symbol (M-PSK or M-QAM) and the antenna index and then transmitted, may be defined as $$m = \frac{1}{L}\left\lfloor \log_2 \binom{M_T}{L} \right\rfloor + \log_2(M).$$

For convenience of description, it is assumed that $M_T=4$, L=2, $$\left\lfloor \log_2 \binom{M_T}{L} \right\rfloor = \lfloor \log_2 6 \rfloor = 2,$$

and M=2(BPSK) may be used.

2 Tx antennas from among four Tx antennas are selected, and data is transmitted using the Alamouti method during 2 timeslots. 2 Tx antenna indexes are selected from among 4 Tx antenna indexes (1~4), and 2 bits are allocated as shown in the following Table 2. The STBC-SM codeword corresponding to the selected antenna is shown in the following equation 11. In Equation 11, a vertical axis may denote an antenna index, and a horizontal axis may denote a timeslot index.

TABLE 2

| Selected antenna indexes | Allocated bits |
| --- | --- |
| (1, 2) | 00 |
| (3, 4) | 01 |
| (2, 3) | 10 |
| (1, 4) | 11 |

$$X_1 = \{X_{11}, X_{12}\} = \left\{ \begin{pmatrix} x_1 & x_2 & 0 & 0 \\ -x_2^* & x_1^* & 0 & 0 \end{pmatrix}, \begin{pmatrix} 0 & 0 & x_1 & x_2 \\ 0 & 0 & -x_2^* & x_1^* \end{pmatrix} \right\}$$ [Equation 11]

$$X_2 = \{X_{21}, X_{22}\} = \left\{ \begin{pmatrix} 0 & x_1 & x_2 & 0 \\ 0 & -x_2^* & x_1^* & 0 \end{pmatrix}, \begin{pmatrix} x_2 & 0 & 0 & x_1 \\ x_1^* & 0 & 0 & -x_2^* \end{pmatrix} \right\} e^{j\theta}$$

In Equation 11, it can be recognized that all codeword elements of the codebook $\chi_2$ are phase-rotated by θ, such that the distance between symbols defined in two codebooks is maximized, resulting in improved BER performance. The value (θ) may be changed according to the number of Tx antennas and the modulation order, and it is impossible to search for the value (θ) using the closed Form, such that the value (θ) must be experimentally searched for. A detailed description thereof will hereinafter be described with reference to the attached drawings.

FIG. 2 is a conceptual diagram illustrating the STBC-SM scheme. For convenience of description, it is assumed that θ=π/2 is decided as shown in FIG. 2.

$x_1, x_2$ may denote BPSK symbols transmitted from respective antennas. Therefore, during two timeslots, one bit is additionally transmitted to each antenna so that a total of 2 bits may be transmitted to the respective antennas. In addition, 2 bits are additionally transmitted to the antenna index, such that a total of 4 bits can be transmitted. In this case, the 4-bit streams may be denoted by $u_1, u_2, u_3, u_4$ as shown in FIG. 2. Assuming that $u_1, u_2$ indicates a bit stream allocated to the antenna index and $u_3, u_4$ indicates a bit stream allocated to the BPSK symbol and then transmitted, a block diagram shown in FIG. 2 may be acquired.

In the meantime, under the condition that a channel is unchanged during only the timeslot (L<$M_T$), if it is assumed that L Tx antennas are selected from among $M_T$ Tx antennas and data is then transmitted at a fixed transfer rate, the STBC-DM scheme transmits some parts of the total amount of Tx data using the SM scheme. As a result, the amount of information, which is located on the Tx symbol and then transmitted, can be greatly reduced as compared to the method for transmitting data using the conventional (L×L)-sized STBC codeword, resulting in acquisition of a BER gain.

The STBC-SSC codebook will hereinafter be described. In accordance with the STBC-SSC method, the GBD-QOSTBC codeword matrix may be modified under the condition that the QO-STBC diversity gain is maintained, resulting in acquisition of the same effect as in the case in which the antennas (1~$M_T$) are not sequentially used according to the data Tx time points.

Since various antenna patterns can be used during the data Tx time ($M_T$), the sequence composed of the antenna indexes may be defined to discriminate among different patterns. A binary bit stream is allocated to the defined sequence, and the allocated binary bit stream may be used. In order to explain the inventive scheme proposed by the present invention, the codebook defined in the legacy STBC-SSC will hereinafter be described.

(1) $\chi_{QAM,QOSTBC}$: QO-STBC symbol vector codebook (comprised of M-PSK and M-QAM symbols)

The QO-STBC symbol vector codebook is used to construct the ($M_T \times M_T$) codeword matrix based on the legacy QO-STBC scheme. In accordance with the proposed scheme, the QO-STBC symbol vector codebook may be used for GBD-QOSTBC symbol transformation (or conversion). The QO-STBC codeword may be acquired by extending the 2×2 Alamouti codeword (Orthogonal STBC) to the ($M_T \times M_T$) matrix based on the ABBA codeword in association with $M_T = 2^2, 2^3, \ldots, 2^r$. Accordingly, the QO-STBC codeword matrix may have half-orthogonal characteristics. That is, each row vector (or each column vector) constructing the QO-STBC codeword matrix may be perpendicular to $M_T/2$ different row vectors (column vectors). In order to easily the above-mentioned characteristics, $C_4^H C_4$ may be represented by the following equation 12 using the QO-STBC codeword shown in Equation 3.

$$C_4^H C_4 = \begin{bmatrix} c & 0 & d & 0 \\ 0 & c & 0 & d \\ d & 0 & c & 0 \\ 0 & d & 0 & c \end{bmatrix} \quad \text{[Equation 12]}$$

In Equation 12, $$c = |s_1|^2 + |s_2|^2 + |\tilde{s}_3|^2 + |\tilde{s}_4|^2$$

and $d = s_1 \tilde{s}_3^* + \tilde{s}_3 s_1^* - s_2 \tilde{s}_4^* - \tilde{s}_4 s_2^*$ may be used. In addition, it can be recognized that the pair of symbols to be joint-ML decoded is composed of $(s_1,s_3),(s_2,s_4)$ as can be seen from Equation 12. If the scope of the present invention is extended for a random value ($M_T$), each of two pairs composed of $M_T/2$ symbols needs to be joint-ML decoded.

In conclusion, the $\chi_{QAM,QOSTBC}$ codebook may be comprised of the codeword vector, the size of which is $M_T/2 \times 1$. Elements of the vector may be symbols, for example, M-PSK, M-QAM, etc. The elements of the vector are composed of a total of $M^{M_T/2}$ vectors, as represented by the following equation 13.

$$\chi_{QAM,QOSTBC} = \left\{ \begin{bmatrix} s_1[1] \\ \vdots \\ s_{M_T/2}[1] \end{bmatrix}, \begin{bmatrix} s_1[2] \\ \vdots \\ s_{M_T/2}[2] \end{bmatrix}, \ldots, \begin{bmatrix} s_1[M^{M_T/2}] \\ \vdots \\ s_{M_T/2}[M^{M_T/2}] \end{bmatrix} \right\} \quad \text{[Equation 13]}$$

$$= \{s[1], s[2], \ldots, s[M^{M_T/2}]\}$$

In Equation 13, $s_n[k] \in \Psi$ may be used, where $k \in \{1,2,\ldots M^{M_T/2}\}, n \in \{1,2,\ldots,M_2/2\}$.

(2) $\chi_{G\text{-}STBC}$: GBD-QOSTBC symbol vector codebook

By means of the above equation 4, the codeword vectors of $\chi_{QAM,QOSTBC}$ defined as the QAM or PSK symbol may be converted into the GBD-QOSTBC symbols as shown in the following equation 14.

$$\chi_{G\text{-}STBC} = \{TDs[1], TDs[2], \ldots, TDs[M^{M_T/2}]\}, \quad \text{[Equation 14]}$$

where $s[k] \in \chi_{QAM,QOSTBC}$ $$= \{S[1], S[2], \ldots, S[M^{M_T/2}]\} =$$

$$\left\{ \begin{bmatrix} S_1[1] \\ \vdots \\ S_{M_T/2}[1] \end{bmatrix}, \begin{bmatrix} S_1[2] \\ \vdots \\ S_{M_T/2}[2] \end{bmatrix}, \ldots, \begin{bmatrix} S_1[M^{M_T/2}] \\ \vdots \\ S_{M_T/2}[M^{M_T/2}] \end{bmatrix} \right\}$$

Equation 14 may be understood as one-to-one mapping (1:1 mapping) between the codeword vectors as shown in the following equation 15.

$$s[1] \to S[1] \quad \text{[Equation 15]}$$
$$s[2] \to S[2]$$
$$\vdots$$
$$s[M^{M_T/2}] \to S[M^{M_T/2}]$$

Referring to Equations 14 and 15, since mapping is achieved on a vector basis, the codeword vector of $\chi_{G\text{-}STBC}$ located nearest to the Rx signal vector is decided, and the symbol vector composed of the QAM symbol of $\chi_{QAM,QOSTBC}$ is detected through the inverse operation. Symbols used in Equation 14 are summarized as follows.

S[k]: $M_T/2 \times 1$-sized codeword vector
$S_j[k]$: elements of the vector S[k], $j \in \{1,2,\ldots M_T/2\}$
$S_j[k] \in \Gamma$ (3) $\chi_{Ant}$: Antenna index sequence codebook 2 consecutive timeslots may be denoted by one unit as represented by $t=(1,2),(3,4),\ldots,(M_T-1,M_T)$, and an antenna index to be used in response to the transmission (Tx) time may be defined. That is, two antenna indexes to be used in 2 consecutive timeslots may be defined. Two antennas may be combined into one pair so that the two antennas may serve as one symbol constructing the antenna index sequence. Therefore, $M_T/2$ antenna pairs may construct one sequence, and the set of different antenna index sequences is denoted by $\chi_{Ant}$. The antenna sequence codebook $\chi_{Ant}$ may be represented by the following equation 16.

$$\chi_{Ant} = \{I_j, u_j, \text{ where } j \in \{1,2,\ldots,2^{B_{SSC}}\}\} \quad \text{[Equation 16]}$$

In Equation 16, $B_{SSC}$ is the amount of information allocated to the antenna index sequence and then transmitted, and is represented on a bit basis. In addition, $I_j$ is the j-th antenna index sequence, and $u_j$ is a bit sequence corresponding to $I_j$. In more detail, $I_j$ and $u_j$ may be represented by the following equation 17.

$$I_j = (l_1, l_2),(l_3,l_4),\ldots,(l_{M_T-1},l_{M_T}), u_j = [u_1, u_2, u_3, \ldots, u_{B_{SSC}}]$$

$$l_i \neq l_j, \forall i, \forall j \in \{1,2,\ldots,2^{B_{SSC}}\},$$

$$u_b \in \{0,1\}, b \in \{1,\ldots,B_{SSC}\}$$

$$u_i \neq u_j, \forall i, \forall j \in \{1,2,\ldots,2^{B_{SSC}}\}. \quad \text{[Equation 17]}$$

(4) $\chi_H$: The set of effective channel matrices $\chi_H$ is the set of ($M_T \times M_T$)-sized effective channel matrices corresponding to the antenna index sequence defined in the codebook $\chi_{Ant}$. This information is owned by only the open loop MIMO system, and may be represented by the following equation 18.

$$\chi_H = \{\hat{H}_1, \hat{H}_2, \ldots, \hat{H}_{2^{B_{SSC}}}\}, \hat{H}_j \in \mathbb{C}^{M_T \times M_T},$$
$$j \in \{1, 2, \ldots, 2^{B_{SSC}}\}$$
[Equation 18]

In Equation 18, $B_{SSC}$ is the amount of information allocated to the antenna index sequence in the same manner as described above. The matrix $\hat{H}_j$ may be decided by $I_j$ of $\chi_{Ant}$. Assuming that data is transmitted using the j-th antenna sequence and the pair of Tx antennas used in 2 timeslots $(t_0, t_0+1)$ is denoted by $(m_1, m_2)$, four elements of the effective channel $\hat{H}_j$ corresponding to $(m_1, m_2)$ may be represented by the following expression.

[Expression]

$\hat{H}_j(m_1, t_0) = h(m_1)$ $\hat{H}_j(m_1, t_0+1) = h(m_2)$ $\hat{H}_j(m_2, t_0) = -h(m_1)^*$ $\hat{H}_j(m_2, t_0+1) = h(m_2)^*$ In the above expression, $h = [h_1 \ h_2 \ \ldots \ h_{M_T}]$ may be used, and $h(m_2)$ is the $m_2$-th element of the vector (h), where a subscript '*' may denote a conjugate complex number. It is assumed that respective elements may be independently from each other, and may have the same independent and identically distributed Gaussian elements, and different vector channels may be independent of each other.

SUMMARY OF THE INVENTION

Accordingly, the present invention is directed to a method for generating a codebook in a MIMO wireless communication system that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a signal to a receiver by a transmitter in a multiple input multiple output (MIMO) wireless communication system includes: generating at least one bit stream by channel-coding data; allocating a first bit stream having a specific size from among the bit streams to an antenna sequence codeword according to an antenna sequence codebook; and transmitting the remaining second bit stream from among the bit streams to the receiver according to the order of antenna pairs indicated by the allocated antenna sequence codeword, wherein the antenna sequence codebook indicates a mapping relationship between the first bit stream and the antenna sequence codeword, and the antenna sequence codeword is defined by two timeslots and two antenna indexes.

The method may further include: constructing the antenna sequence codebook, wherein the antenna sequence codebook is constructed on the basis of a minimum Hamming distance between sequences, the minimum Hamming distance being decided according to the number of requisite sequences.

The method may further include: receiving operation processing ability information from the receiver; and constructing the antenna sequence codebook on the basis of the operation processing ability information.

The constructing the antenna sequence codebook may include: if the operation processing ability information is equal to or higher than a first threshold value, constructing the antenna sequence codebook on the basis of a minimum Hamming distance between sequences of less than a second threshold value. The constructing the antenna sequence codebook may include: if the operation processing ability information is less than a first threshold value, constructing the antenna sequence codebook on the basis of a minimum Hamming distance between sequences of equal to or higher than a second threshold value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a flow chart of a method for transmitting a signal to a receiver by a transmitter in a multiple input multiple output (MIMO) wireless communication system according to the embodiments of the present invention.

DESCRIPTION OF SPECIFIC EMBODIMENTS

Figure 1:
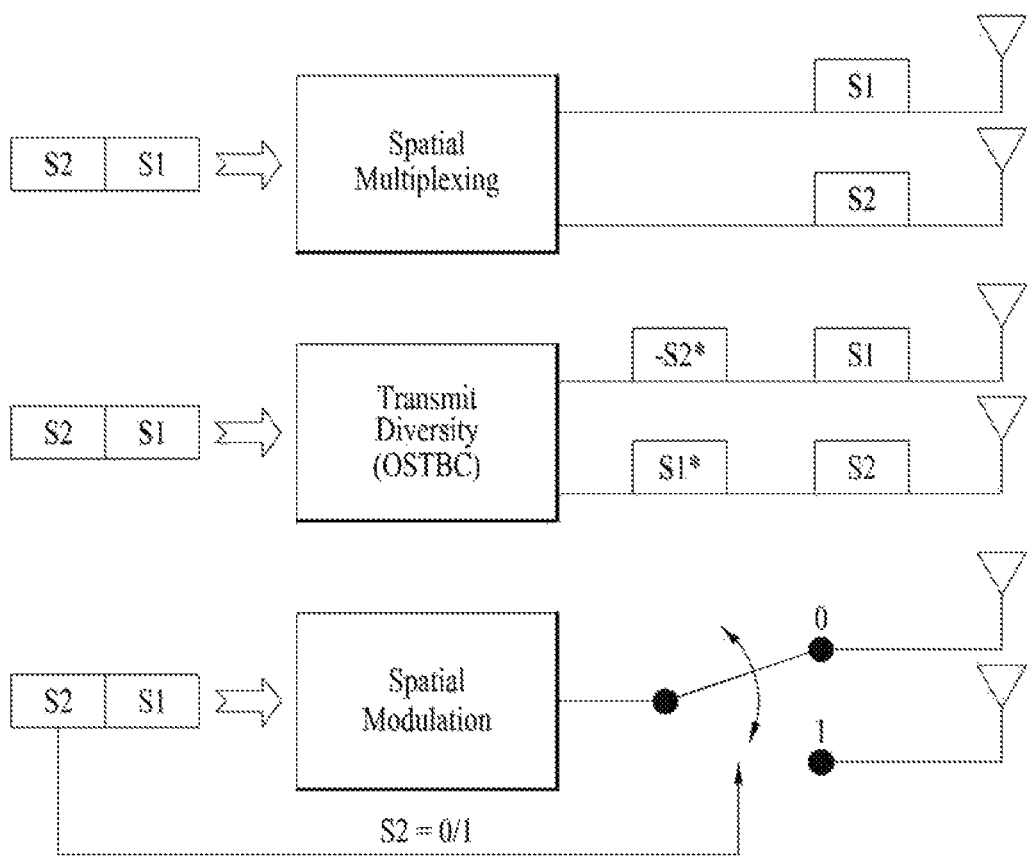
FIG. 1 is a conceptual diagram illustrating the SM scheme.
Figure 2:
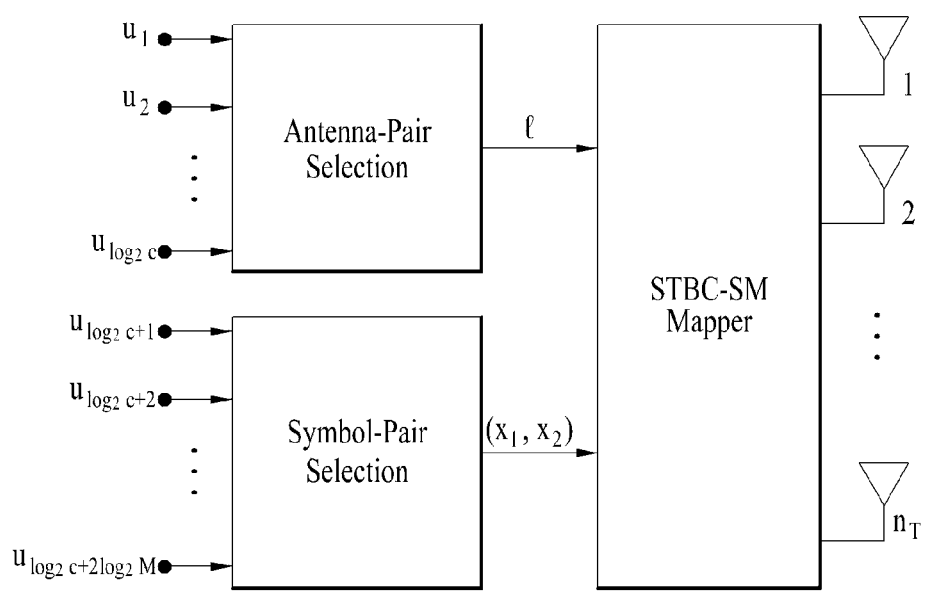
FIG. 2 is a conceptual diagram illustrating the STBC-SM scheme.

When time/frequency/space resources are fixed, the amount of information (i.e., the number of bits) per Tx data stream must be increased to improve the frequency efficiency per cell. That is, M-PSK and M-QAM symbols, each of which has a high modulation order, may be transmitted. However, a minimum distance between symbols located over the signal constellation is reduced, such that the BER (Block Error Rate) performance may be deteriorated at the same SNR. The closed loop MIMO system in which a base station (BS) can utilize channel information between the transmitter and the receiver increases a valid reception (Rx) SNR using the MIMO beamforming scheme, such that it can directly increase the Achievable Rate (AR).

However, the SNR gain based on the beamforming method is determined by the number of Rx antennas according to the open loop MIMO system, such that the Rx SNR gain (array gain) is decided by the number of Rx antennas. As a result, although many antennas of the BS are present, it may be difficult to directly increase the Rx SNR in so far as Tx power is not amplified. Accordingly, when the restriction condition of a minimum BER to be guaranteed in the open loop MIMO system is present, the STBC-SSC (space time block code-spatial sequence coding) scheme capable of transmitting much more data than the legacy open loop MIMO data Tx/Rx schemes has recently been proposed.

When data is transmitted and received according to the STBC scheme based on the Alamouti code in the actual wireless communication system, the UE may apply a conjugate complex number to the symbol received at the even-th time (or at the odd-th time), such that the result may be used as the effective Rx data. The above-mentioned condition is needed to achieve orthogonality between the effective channel vectors during two timeslots. The number of sequences capable of being made by STBC-SSC may be greatly limited at the above condition.

In addition, assuming that duplication components among different index sequences are used according to the legacy STBC-SSC scheme are present according to the scheme proposed by the legacy STBC-SSC scheme (i.e., assuming that the effective channel matrices corresponding to different sequences have the same components), the probability of generating errors between the sequences may unavoidably increase.

In order to address the above problem, the technical concept of the present invention is as follows.

When data is transmitted and received according to the STBC-SSC scheme, if the used effective channel information is wrongly decoded, there is a high probability that not only data loaded on the sequence but also the Tx data stream is incorrectly decoded. Therefore, the method for minimizing the probability of generating the error between the sequences is of importance.

In accordance with the present invention, the Hamming distance may be defined in consideration of the duplication symbol (index) between different sequences according to the embodiment of the present invention, such that the number of sequences capable of being generated can be proposed and generated according to the embodiment of the present invention. In addition, the present invention proposes a guide line in a manner that the Hamming distance between the sequences can be sequentially used in descending numerical order of the Hamming distance according to the number of used sequences. In addition, in order to reduce the probability of generating the error of data located on the antenna index sequence, the sequence codebook may be decided using the Hamming distance ($\chi_{SSC}$). In order to reduce the probability of generating the error between the decided sequences, a method for rotating the phase of the Tx symbol codeword matrix (or the effective channel matrices) corresponding to the sequence is proposed.

Although the UE may apply a conjugate complex number to the Rx symbol at the reception time of the even-th data or the odd-th data, and the antenna pairs to be used in two timeslots are restricted to the odd index and the even index and are composed of only the odd and even indexes, the amount of information capable of being loaded and transmitted according to the proposed scheme of the present invention may be denoted by $\log_2 M_T - 2$ (i.e., the number of bits per channel use (bits/channel use)). The amount of information may be identical to a maximum amount of information (i.e., the number of bits per channel use) capable of being generated using the legacy STBC-SSC scheme without any restriction.

In addition, assuming that a maximum diversity gain is set to '1' and the SM gain capable of being obtained using all Tx antenna resources is set to $\log_2 M_T$ (bits/channel use), the proposed scheme has an advantage in that a maximum diversity gain is set to $M_T$ and the number of antennas increases, the scope of the proposed scheme can also be increased in the same scale. Therefore, when considering the Tx/Rx operations based on the legacy Alamouti code, the present invention may relate to the core technology by which the STBC-SSC scehme can be utilized in the actual system.

When 2 data symbols are transmitted using 2 timeslots and 2 antennas, two kinds of patterns based on the Alamouti block are proposed by changing the pattern of the symbol transmitted from the base station (BS) in such a manner that the UE can recognize the changed results as different kinds of information. It is assumed that the (2×1) MISO (Multiple Input Single Output) environment in which two BS antennas and one UE antenna are used is used.

The base station (BS) may transmit the complex symbols $(S_1, S_2)$ using two antennas for a predetermined time corresponding to two symbol Tx times $(S_1, S_2 \in \Psi$ or $S_1, S_2 \in \Gamma)$. In this case, the binary signals (0, 1) may be allocated according to the Tx symbol pattern as represented by the following equation 19.

$$\begin{bmatrix} S_1 & S_2 \\ -S_2^* & S_1^* \end{bmatrix} \to 0 \begin{bmatrix} S_2 & S_1 \\ S_1^* & -S_2^* \end{bmatrix} \to 1 \qquad \text{[Equation 19]}$$

In all the two cases, the symbols transmitted during 2 timeslots may be identical to each other. Therefore, the BS may additionally transmit one bit (1 bit) other than two modulation signals $(S_1, S_2)$ during 2 timeslots. When data is transmitted according to the above-mentioned pattern, the corresponding effective channels are represented by the following equation 20.

$$H_0 = \begin{bmatrix} h_1 & h_2 \\ h_2^* & -h_1^* \end{bmatrix}, H_1 = \begin{bmatrix} h_2 & h_1 \\ h_1^* & -h_2^* \end{bmatrix} \qquad \text{[Equation 20]}$$

In Equation 20, $h_1$ is a channel between the BS antenna 1 and the UE antenna, and $h_2$ is a channel between the BS antenna 2 and the UE antenna. In this case, the UE operations are as follows.

The UE may use the conjugate complex number of the Rx symbol at the even-th Rx time, and may perform decoding on the basis of the symbol received through two timeslots. In addition, the UE may have two effective channel matrices serving as one set. The original signal can be searched for on the basis of the above-mentioned effective channel matrix, as represented by the following equation 21.

$$\tilde{y}_0 = \left\| H_0^H y - H_0^H H_0 \begin{bmatrix} S_1 \\ S_2 \end{bmatrix} \right\|, \text{where } \tilde{y}_0: \text{real value} \qquad \text{[Equation 21]}$$

$$\tilde{y}_1 = \left\| H_1^H y - H_1^H H_1 \begin{bmatrix} S_1 \\ S_2 \end{bmatrix} \right\|, \text{where } \tilde{y}_1: \text{real value}$$

When $H_0^H H_0, H_1^H H_1$ of Equation 21 are calculated, it can be recognized that $H_0^H H_0, H_1^H H_1$ may be diagonal matrices, respectively. However, if the conjugate transpose matrix of the effective channel matrix not corresponding to the Tx symbol pattern is multiplex by the Tx symbol pattern, orthogonality is not achieved, such that Equation 22 can be obtained.

$$H_1^H H_0 = \begin{bmatrix} h_2^* & h_1 \\ h_1^* & -h_2 \end{bmatrix} \begin{bmatrix} h_1 & h_2 \\ h_2^* & -h_1^* \end{bmatrix} = \begin{bmatrix} 2h_2^* h_1 & h_2^* h_2 - h_1 h_1^* \\ h_1 h_1^* - h_2^* h_2 & 2h_1^* h_2 \end{bmatrix}$$

$$H_0^H H_1 = \begin{bmatrix} h_1^* & h_2 \\ h_2^* & -h_1 \end{bmatrix} \begin{bmatrix} h_2 & h_1 \\ h_1^* & -h_2^* \end{bmatrix} = \begin{bmatrix} 2h_1^* h_2 & -h_2^* h_2 - h_1 h_1^* \\ -h_1 h_1^* + h_2^* h_2 & 2h_2^* h_1 \end{bmatrix}$$

[Equation 22]

In contrast, if the conjugate complex number of the effective channel matrix is multiplied by the Tx symbol, the diagonal matrix shown in the following equation 23 can be acquired.

$$H_0^H H_0 = H_1^H H_1 = \begin{bmatrix} h_1^* & h_2 \\ h_2^* & -h_1 \end{bmatrix} \begin{bmatrix} h_1 & h_2 \\ h_2^* & -h_1^* \end{bmatrix} = \begin{bmatrix} h_1 h_1^* + h_2^* h_2 & 0 \\ 0 & h_1 h_1^* + h_2^* h_2 \end{bmatrix}$$

[Equation 23]

Based on the above equations, it is assumed that data (i.e., binary number '0') is transmitted using the patterns shown in the left side of Equation 19, and a method for allowing the UE to reconstruct the original signal using 2 effective channel matrices will hereinafter be described. First, the valid channel matrix corresponding to the Tx symbol pattern may be summarized as shown in the following equation 24.

$$\tilde{y}_0(H_0) = \left\| H_0^H y - H_0^H H_0 \begin{bmatrix} S_1 \\ S_2 \end{bmatrix} \right\|$$

$$= \left\| \begin{bmatrix} h_1^* & h_2 \\ h_2^* & -h_1 \end{bmatrix} \left( \begin{bmatrix} h_1 & h_2 \\ h_2^* & -h_1^* \end{bmatrix} \begin{bmatrix} S_1 \\ S_2 \end{bmatrix} \right) - \begin{bmatrix} h_1 h_1^* + h_2^* h_2 & 0 \\ 0 & h_1 h_1^* + h_2^* h_2 \end{bmatrix} \begin{bmatrix} S_1 \\ S_2 \end{bmatrix} \right\|$$

$$= \left\| \begin{bmatrix} h_1 h_1^* + h_2^* h_2 & 0 \\ 0 & h_1 h_1^* + h_2^* h_2 \end{bmatrix} \begin{bmatrix} S_1 \\ S_2 \end{bmatrix} - \begin{bmatrix} h_1 h_1^* + h_2^* h_2 & 0 \\ 0 & h_1 h_1^* + h_2^* h_2 \end{bmatrix} \begin{bmatrix} S_1 \\ S_2 \end{bmatrix} \right\|$$

$$= 0$$

[Equation 24]

If it is assumed that no noise exists as shown in the above equation 24, the value ($\tilde{y}_0$) may be set to zero as shown in the following equation 25.

$$\tilde{y}_0(H_1) = \left\| H_1^H y - H_1^H H_1 \begin{bmatrix} S_1 \\ S_2 \end{bmatrix} \right\|$$

$$= \left\| \begin{bmatrix} h_2^* & h_1 \\ h_1^* & -h_2 \end{bmatrix} \left( \begin{bmatrix} h_1 & h_2 \\ h_2^* & -h_1^* \end{bmatrix} \begin{bmatrix} S_1 \\ S_2 \end{bmatrix} \right) - \begin{bmatrix} h_1 h_1^* + h_2^* h_2 & 0 \\ 0 & h_1 h_1^* + h_2^* h_2 \end{bmatrix} \begin{bmatrix} S_1 \\ S_2 \end{bmatrix} \right\|$$

$$= \left\| \begin{bmatrix} 2h_2^* h_1 & h_2^* h_2 - h_1 h_1^* \\ h_1 h_1^* - h_2^* h_2 & 2h_1^* h_2 \end{bmatrix} \begin{bmatrix} S_1 \\ S_2 \end{bmatrix} - \begin{bmatrix} h_1 h_1^* + h_2^* h_2 & 0 \\ 0 & h_1 h_1^* + h_2^* h_2 \end{bmatrix} \begin{bmatrix} S_1 \\ S_2 \end{bmatrix} \right\|$$

$$= \left\| \begin{bmatrix} (2h_2^* h_1 - h_1 h_1^* - h_2^* h_2) S_1 + (h_2^* h_2 - h_1 h_1^*) S_2 \\ (h_2^* h_2 - h_1 h_1^*) S_1 + (2h_2^* h_1 - h_1 h_1^* - h_2^* h_2) S_2 \end{bmatrix} \right\|$$

$$= \eta > 0, \text{ where } h_1 \neq h_2$$

[Equation 25]

If $h_1 \neq h_2$ is given, the resultant value is always higher than zero '0'. $h_1, h_2$ are denoted by the (i.i.d) complex Gaussian random variables, such that the probability that two variables serving as the (i.i.d) complex Gaussian random variables have the same value may be very close to zero '0'. Therefore, $\tilde{y}_0(H_1) > \tilde{y}_0(H_0)$ may be used in most of the cases. In conclusion, the UE may acquire the same effect as in the case in which the antenna 1 and the antenna 2 of the BS are replaced with each other, such that the amount of data loaded on the symbol can be greatly reduced by 0.5 bit (or bps/Hz) per channel use as compared to the Alamouti method.

Finally, it should be noted that all the above schemes are not applied to different Alamouti blocks without any problems. It is impossible to discriminate between the first Tx symbol pattern of Equation 19 and the symbol pattern of Equation 26.

$$\begin{bmatrix} S_2 & S_1 \\ -S_1^* & S_2^* \end{bmatrix} \to H_2 = \begin{bmatrix} h_2 & h_1 \\ -h_1^* & h_2^* \end{bmatrix}$$

[Equation 26]

A detailed description thereof will hereinafter be given.

The Tx symbol vector codebook (where, the modulation order is BPSK) may be denoted by $$s = \begin{bmatrix} s_1 \\ s_2 \end{bmatrix} \to \left\{ \begin{bmatrix} 1 \\ 1 \end{bmatrix}, \begin{bmatrix} 1 \\ -1 \end{bmatrix}, \begin{bmatrix} -1 \\ 1 \end{bmatrix}, \begin{bmatrix} -1 \\ -1 \end{bmatrix} \right\} = \{11, 10, 01, 00\},$$

the Tx symbol and the effective channel matrix are identical to those of Equation 19 and Equation 20, and it is assumed that '111' is transmitted as the sequence of 3 bits.

In this case, assuming that the first bit '1' is data based on the symbol pattern and the remaining two bits are transmitted as the BPSK symbol, the Tx symbol pattern is denoted by $$\begin{bmatrix} S_2 & S_1 \\ S_1^* & -S_2^* \end{bmatrix}$$

and two symbols are denoted by $S_1=1, S_2=1$, respectively. Although it is necessary for the above calculation to be applied to all the four Tx symbol vectors, it is assumed that the Tx symbols ($S_1=1, S_2=1$) are used for convenience of description, and it is determined whether the respective Tx symbol patterns can be distinguished from each other in association with the Tx symbol patterns.

The Rx symbol vector is denoted by the following equation 27, ML (Maximum Likelihood) decoding is based on the following equation 28, and the absence of noise is assumed.

$$y_{2\times 1} = \begin{bmatrix} h_2 & h_1 \\ h_1^* & -h_2^* \end{bmatrix} \begin{bmatrix} 1 \\ 1 \end{bmatrix} + n_{2\times 1},$$

[Equation 27]

$n_{2\times 1}$: white Gaussian noise vector $$j^* = \underset{\forall j}{\operatorname{argmin}} \left\| H_j^H y_{2\times 1} - H_j H_j^H \begin{bmatrix} 1 \\ 1 \end{bmatrix} \right\|_2$$

[Equation 28]

If the absence of noise is assumed, the following equation 29 can be acquired in association with $H_0, H_1$.

$$j = 0: l_0 \quad \text{[Equation 29]}$$

$$= \left\| \begin{bmatrix} 2h_1^* h_2 & -h_2^* h_2 + h_1 h_1^* \\ -h_1 h_1^* + h_2^* h_2 & 2h_2^* h_1 \end{bmatrix} \begin{bmatrix} 1 \\ 1 \end{bmatrix} - \right.$$

$$\left. \begin{bmatrix} h_2^* h_2 + h_1^* h_1 & 0 \\ 0 & h_2^* h_2 + h_1^* h_1 \end{bmatrix} \begin{bmatrix} 1 \\ 1 \end{bmatrix} \right\|_2$$

$$= \left\| \begin{bmatrix} 2h_1^* h_2 - h_2^* h_2 + h_1 h_1^* \\ -h_1 h_1^* + h_2^* h_2 + 2h_2^* h_1 \end{bmatrix} - \begin{bmatrix} h_2^* h_2 + h_1^* h_1 \\ h_2^* h_2 + h_1^* h_1 \end{bmatrix} \right\|_2$$

$$= \left\| \begin{bmatrix} 2h_1^* h_2 - 2h_2^* h_2 \\ -2h_1 h_1^* + 2h_2^* h_1 \end{bmatrix} \right\|_2,$$

$$j = 1: l_1$$

$$= \left\| \begin{bmatrix} h_2^* h_2 + h_1^* h_1 & 0 \\ 0 & h_2^* h_2 + h_1^* h_1 \end{bmatrix} \begin{bmatrix} 1 \\ 1 \end{bmatrix} - \right.$$

$$\left. \begin{bmatrix} h_2^* h_2 + h_1^* h_1 & 0 \\ 0 & h_2^* h_2 + h_1^* h_1 \end{bmatrix} \begin{bmatrix} 1 \\ 1 \end{bmatrix} \right\|_2$$

$$= 0.$$

If $h_1 \neq h_2$ is given, $l_1$ is always less than $l_0$, so that $H_1$ is then selected. Accordingly, if it is assumed that the used channel can be correctly searched for and the Tx symbol is reconstructed without any errors, the transmitted binary data (111) can be acquired.

Figure 3:
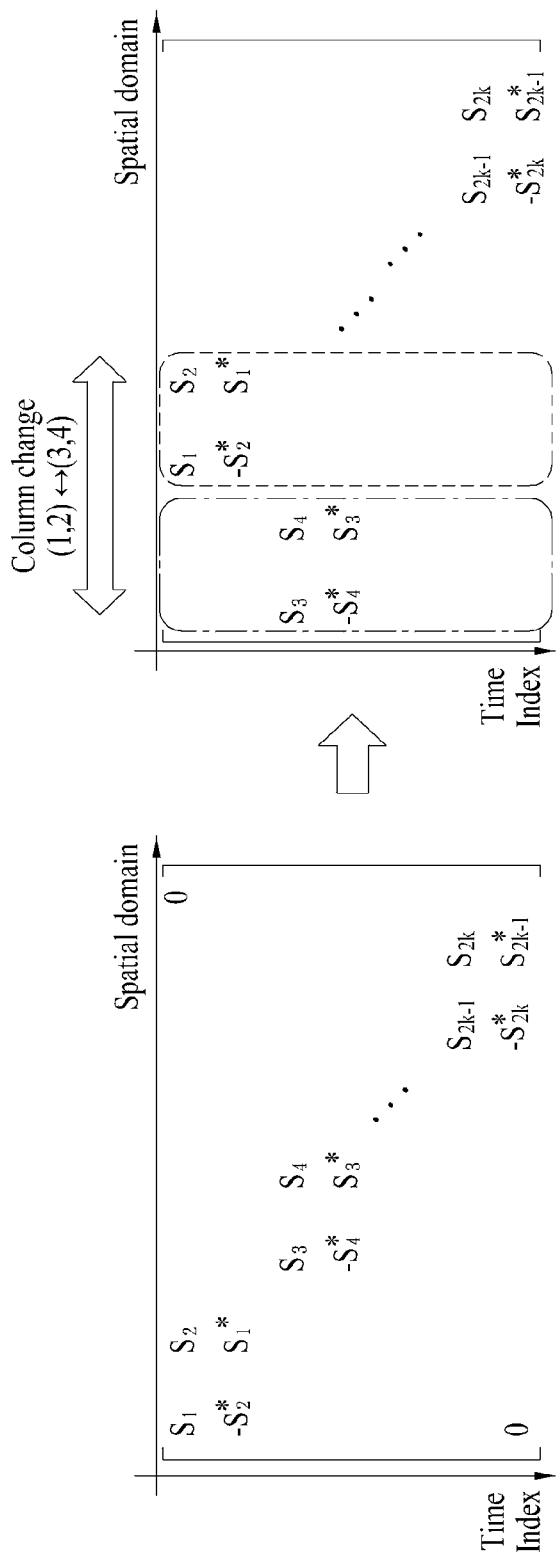
FIG. 3 is a conceptual diagram illustrating an exemplary method for generating the codeword matrix based on the conventional STBC-SSC scheme.

A method for generating the sequence codeword will hereinafter be described. Prior to describing the present invention, a method for generating the sequence codeword based on the legacy STBC-SSC scheme will hereinafter be described. FIG. 3 is a conceptual diagram illustrating a method for generating the codeword matrix based on the legacy STBC-SSC scheme.

The legacy GBD-QOSTBC scheme may use the codeword formed in the block diagonal matrix as shown in the following description. The Alamouti block is constructed on the basis of 2 timeslots during a total of $M_T$ timeslots, and $M_T$ data symbols are transmitted (i.e., $S_j \in \Gamma$) However, since the average BER performances of the QOSTBC scheme are identical to each other irrespective of the block diagonal matrix, the STBC-SSC scheme arbitrarily adjusts the order of antennas to be used according to lapse of time during transmission of the Alamouti block. As result, several codeword matrices (i.e., matrices composed of Tx symbols) are constructed and the sequence is defined in response to the antenna index to be used according to lapse of time.

However, assuming that the channel is unchanged during the timeslot ($M_T > 2$), orthogonality between symbol vectors transmitted in two consecutive timeslots need not always be guaranteed. Specifically, orthogonality between the (2×1) symbol vector corresponding to the first transmission and the other (2×1) symbol vector corresponding to the last transmission is achieved, such that the Alamouti block may be constructed on the basis of the timeslot through which the two symbol vectors are transmitted.

Therefore, the present invention constructs the Alamouti block ($S_j \in \Gamma, j=1,2, \ldots, M_T$) using the GBD-QOSTBC symbols so as to acquire the diversity gain, two timeslots are selected from among all the timeslots ($1 \sim M_T$). Here, two antennas to be used may be decided. Thereafter, one Alamouti blocks may be constructed on the basis of 4 elements (of the ($M_T \times M_T$) matrix).

However, a conjugate complex number of the signal received at the even-th time is stored as the actual Rx signal and the stored result may be used to reconstruct the original signal. Therefore, among all the timeslots ($1 \sim M_T$), the Alamouti block in which the odd-th timeslot and the even-th timeslot are combined into one pair may be constructed. The matrix of Equation 30 may be used.

$$\hat{C}_{M_T} = \begin{bmatrix} S_1 & 0 & 0 & S_2 \\ 0 & -S_3^* & S_4^* & 0 \\ 0 & S_4 & S_3 & 0 \\ -S_2^* & 0 & 0 & S_1^* \end{bmatrix} \quad \text{[Equation 30]}$$

In Equation 28, the horizontal axis may denote the antenna index, and a vertical axis may denote the timeslot. In Equation 28, the symbol vectors applied to the first and fourth timeslots are perpendicular to each other, and the symbol vectors applied to the second and third timeslots are perpendicular to each other. The antennas used at each Tx time may be the antenna indexes (1,4) at t=1, may be the antenna indexes (2,3) at t=2,3, and may be the antenna indexes (1,4) at t=4. Therefore, since it is difficult for the antenna indexes sequentially used on the basis of 2 timeslots in the same manner as in the conventional method to be defined as the sequence, the present invention proposes a method for defining the sequence codebook, and a detailed description thereof will be given.

First of all, space time resources needed to generate the sequence are defined.

Antenna index set : Two indexes from among the Tx antennas ($1 \sim M_T$) may be constructed as one pair, and $M_T/2$ different antenna index pairs may construct a single antenna index set. The same indexes are not overlapped with each other within the single antenna index set. In addition, it is impossible for different antenna index sets to have the same antenna index pairs. The l-th antenna set is represented by the following equation 31.

$$\mathcal{A}_l = \{(a_1, a_2), (a_3, a_4), \ldots, (a_{M_T-1}, a_{M_T})\}$$

$l \in \{1, 2, \ldots, 2M_T - 2\}$—A total number of antenna index sets: $2M_T - 2$ $a_i, a_j \in \{1, 2, \ldots, M_T\}$, where $a_i \neq a_j$ for $i \neq j$, $i, j \in \{1, 2, \ldots, M_T\}$ $(a_i, a_j) \neq (a_j, a_i)$ for $i \neq j$ where $i, j \in \{1, 2, \ldots, M_T\}$ If $(a_i, a_j) \in \mathcal{A}_l$, then $(a_i, a_j) \notin \mathcal{A}_k$ for $k \in \{1, 2, \ldots, 2M_T - 2\}$, $k \neq l$ [Equation 31]

Timeslot set: the odd timeslot and the even timeslot may construct one pair, and $M_T/2$ different pairs may construct one timeslot set. The indexes are not overlapped within the same set. The k-th timeslot set is represented by the following equation 32.

$$\mathcal{T}_k = \{(t_1, t_2), (t_3, t_4), \ldots, (t_{M_T-1}, t_{M_T})\}$$

$k \in \{1, 2, \ldots, M_T/2\}$—A total number of index sets: $M_T/2$ $t_{2j-1} \in \{1, 3, \ldots, M_T - 1\}, t_{2j} \in \{2, 4, \ldots, M_T\}$, where $j \in \{1, 2, \ldots, M_T/2\}$ $(t_i, t_j) \neq (t_j, t_i)$, $i, j \in \{1, 2, \ldots, M_T\}$, $i \neq j$ If $(t_i, t_j) \in \mathcal{T}_l$, then $(t_i, t_j) \notin \mathcal{T}_k$ for $l, k \in \{1, 2, \ldots, M_T/2\}$, $k \neq l$ [Equation 32]

After that, the codebook to be used is defined. In order to avoid confusion of terms, the result regarding the space time resources needed to generate the sequence may be denoted by the set (or aggregate), and the sequence set may be defined as the codebook. The effective channel codebook and the Tx symbol codebook may be naturally decided according to the sequence codebook.

(A) $\chi_{SSC}$: The sequence codebook is owned by both BS and UE, and may be defined as shown in the following equation 33.

$$\chi_{SSC} = \{I(j, \mathcal{T}_k), u(j, \mathcal{T}_k) : k \in \{1, 2, \ldots, M_T/2\}, j \in \{1, 2, \ldots, 2^{B_{SSC}/M_T/2}\}\}$$ [Equation 33]

In Equation 33, $B_{SSC}$, the amount of information to be allocated to the antenna index sequence and then transmitted, may be on a bit basis. $I(j, \mathcal{T}_k)$ is the j-th sequence mapped to the k-th timeslot set, and may be defined as the following equation 34.

$$I(j, \mathcal{T}_k) = ((a_1, a_2), (t_1, t_2)), \ldots, ((a_{M_T-1}, a_{M_T}), (t_{M_T-1}, t_{M_T}))$$

$$j \in \{1, 2, \ldots, 2^{B_{SSC}}\}$$ [Equation 34]

In addition, $u(j, \mathcal{T}_k)$ is a binary bit stream corresponding to the sequence $I(j, \mathcal{T}_k)$, and may be defined as shown in the following equation 35.

$$u(j, \mathcal{T}_k) = [u_1, u_2, u_3, \ldots, u_{B_{SSC}}]$$

$$u_b \in \{0, 1\}, \text{ where } b \in \{1, \ldots, B_{SSC}\}$$ [Equation 35]

(B) $\chi_H$: The effective channel matrix codebook may denote the set of ($M_T \times M_T$)-sized effective channel matrices corresponding to the sequence defined in $\chi_{SSC}$, and may be owned only by the UE and may be defined as shown in the following equation 36.

$$\chi_H = \{\hat{H}_{j,k} \in \mathbb{C}^{M_T \times M_T}, \text{ where } j \in \{1, 2, \ldots, 2^{B_{SSC}/M_T/2}\}, k \in \{1, 2, \ldots, M_T/2\}\}$$ [Equation 36]

(C) $\chi_S$: Tx symbol codebook may denote the set of matrices composed of ($M_T \times M_T$)-sized Tx symbols corresponding to the sequence defined in $\chi_{SSC}$, and may serve as information owned by the BS only. The Tx symbol codebook may be represented by the following equation 37.

$$\chi_S = \{\hat{S}_{j,k} \in \mathbb{C}^{M_T \times M_T}, \text{ where } j \in \{1, 2, \ldots, 2^{B_{SSC}/M_T/2}\}\}$$ [Equation 37]

The matrix ($\hat{S}_{j,k}$) defined in Equation 37 may be decided according to $I(j, \mathcal{T}_k)$ of $\chi_{SSC}$. From among the sequences mapped to the k-th timeslot set, the j-th sequence may be represented by the following equation 38.

$$I(j, \mathcal{T}_k) = ((a_1, a_2), (t_1, t_2)), \ldots, ((a_{M_T-1}, a_{M_T}), (t_{M_T-1}, t_{M_T})) \text{ where } \mathcal{T}_k = \{(t_1, t_2), (t_3, t_4), \ldots, (t_{M_T-1}, t_{M_T})\}$$ [Equation 38]

In addition, assuming that one Alamouti block is constructed in the Tx symbol matrix $\hat{S}_{j,k}$ using the first symbols $((a_1, a_2), (t_1, t_2))$ configured to construct the sequence $I(j, \mathcal{T}_k)$, $(a_1, a_2)$ is an index of the column vector and $(t_1, t_2)$ is an index of the row vector. 4 elements $(a_1, t_1), (a_1, t_2), (a_2, t_1), (a_2, t_2)$ of the matrix may be used as one Alamouti block, such that $\hat{S}_{j,k}(t_1, a_1) = S_{t_1}$, $\hat{S}_{j,k}(t_1, a_2) = S_{t_2}$, $\hat{S}_{j,k}(t_2, a_1) = -S_{t_2}^*$ and $\hat{S}_{j,k}(t_2, a_2) = S_{t_1}^*$ may appear.

Likewise, 4 elements of the effective channel ($\hat{H}_j$) may be denoted by $\hat{H}_j(t_1, t_1) = h(a_1)$, $\hat{H}_j(t_1, t_2) = h(a_2)$, $\hat{H}_j(t_2, t_1) = h(a_2)^*$, and $\hat{H}_j(t_2, t_2) = -h(a_1)^*$, respectively.

The codebook ($\chi_{QAM,QOSTBC}$) composed of the QAM based symbol vector, and the codebook ($\chi_{G-STBC}$) of the GBD-QOSTBC symbol vector are identical to those of the background art of the present invention.

The UE and BS operations needed for sequence generation and data transmission/reception according to the above-mentioned codebook and set will hereinafter be given. First of all, the time slot set $\mathcal{T}_k \{(t_1, t_2), (t_3, t_4), \ldots, (t_{M_T-1}, t_{M_T})\}$ shown in Equation 32 may be defined, and the antenna index set $\mathcal{A}_l = \{(a_1, a_2), (a_3, a_4), \ldots, (a_{M_T-1}, a_{M_T})\}$ shown in Equation 31 may be defined.

$M_T/2$ antenna pairs defined in the l-th antenna index set ($\mathcal{A}_l$) are enumerated, such that the antenna index sequence is constructed. $M_T/2$ antenna pairs are enumerated, such that a total of $$\frac{M_T}{2}!$$

sequences may be constructed using the set $\mathcal{A}_l$. The above-mentioned operations can also be applied to $\mathcal{A}_1, \mathcal{A}_2, \ldots, \mathcal{A}_{2M_T-2}$ in the same manner as described above. The generated antenna index sequences are mapped to the above-mentioned timeslot set ($\mathcal{T}_k$), such that the sequence $I(j, \mathcal{T}_k)$ may be defined as shown in Equation 38, and the binary bit stream $u(j, \mathcal{T}_k)$ may be allocated to the generated sequence.

The sequence codebook ($\chi_{SSC}$) may be comprised of the defined values ($I(j, \mathcal{T}_k), u(j, \mathcal{T}_k)$). The BS and the UE may share the codebook information, and the UE may construct the effective channel matrix codebook defined in Equation 36 on the basis of the estimated channel information. The BS may construct the set in which the Tx symbol matrices defined in Equation 37 are used as the elements.

Figure 4:
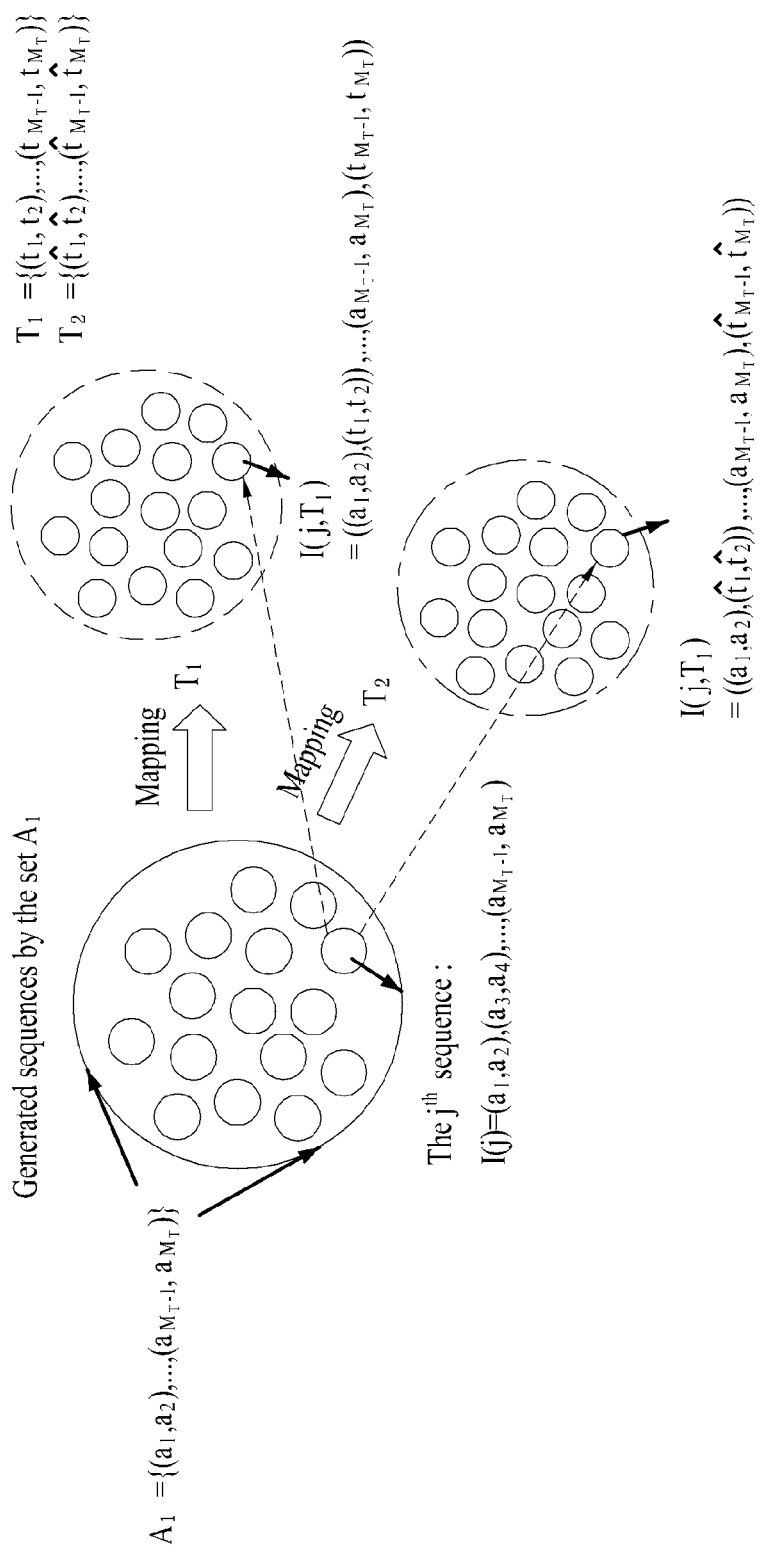
FIG. 4 is a conceptual diagram illustrating the sequence generation principle according to the embodiments of the present invention.

FIG. 4 is a conceptual diagram illustrating the sequence generation principle according to the embodiments of the present invention.

Referring to FIG. 4, several sequences may be generated using the antenna index set ($\mathcal{A}_1$). In this case, the j-th antenna index sequence $I(j)$ may be respectively mapped to the timeslot sets ($\mathcal{T}_1, \mathcal{T}_2$). In this case, the j-th antenna index sequence $I(j)$ may be mapped to each of the timeslot sets ($\mathcal{T}_1, \mathcal{T}_2$), such that two sequences may occur. In FIG. 4, the smaller-sized circles contained in the large-sized circle may denote independent sequences, respectively. A method for generating different sequences through timeslot set mapping will hereinafter be described.

First of all, if it is assumed that $I(j) = (1,2), (3,4), (5,6), (7,8)$ is used, if two different timeslot sets are considered as represented by $\mathcal{T}_1 = (1,2), (3,4), (5,6), (7,8)$, $\mathcal{T}_2 = (1,8), (7,2), (5,4), (3,6)$, two sequences may be represented by the following equation 39.

$$I(j, \mathcal{T}_1) = \left( \underbrace{(1, 2)}_{\text{antenna index}}, \underbrace{(1, 2)}_{\text{time index}} \right),$$
$$((3, 4), (3, 4)), ((5, 6), (5, 6)), ((7, 8), (7, 8))$$

$$I(j, \mathcal{T}_2) = \left( \underbrace{(1, 2)}_{\text{antenna index}}, \underbrace{(1, 8)}_{\text{time index}} \right),$$
$$((3, 4), (7, 2)), ((5, 6), (5, 4)), ((7, 8), (3, 6))$$

[Equation 39]

In Equation 39, symbols shown in Equation 39 may be comprised of a total of 4 indexes, and two first indexes may denote the antenna index, and the remaining two indexes may denote the timeslot index. The Tx symbol codebook $\chi_s = \{\hat{S}_{j,1}, \hat{S}_{j,2}\}$ may be composed of the matrices of Equation 40.

$$\hat{S}_{j,1} = \begin{bmatrix} S_1 & S_2 & & & & & & \\ -S_2^* & S_1^* & & & & & & \\ & & S_3 & S_4 & & & & \\ & & -S_4^* & S_3^* & & & & \\ & & & & S_5 & S_6 & & \\ & & & & -S_6^* & S_5^* & & \\ & & & & & & S_7 & S_8 \\ & & & & & & -S_8^* & S_7^* \end{bmatrix},$$

$$\hat{S}_{j,2} = \begin{bmatrix} S_1 & & & & & & & S_8 \\ & S_7 & S_2 & & & & & \\ & & & S_3 & S_6 & & & \\ & & & -S_4^* & -S_5^* & & & \\ & & & S_5 & S_4 & & & \\ & & & & & -S_6^* & S_3^* & \\ & -S_2^* & S_7^* & & & & & \\ -S_8^* & S_1^* & & & & & & \end{bmatrix}$$
[Equation 40]

In the matrices ($\hat{S}_{j,1}, \hat{S}_{j,2}$) of Equation 40, the horizontal axis may denote the antenna index, and the vertical axis may denote the timeslot index. One symbol constructing the sequence may denote (($a_1, a_2$),($t_1, t_2$)), $a_1, a_2$ may denote the antenna indexes, and $t_1, t_2$ may denote the timeslot indexes of the symbols corresponding to $a_1, a_2$, such that the resultant values may be mapped to $\hat{S}_{j,k}(t_1, a_1) = S_{t_1}$, $\hat{S}_{j,k}(t_1, a_2) = S_{t_2}$, $\hat{S}_{j,k}(t_2, a_1) = -S_{t_2}^*$ and $\hat{S}_{j,k}(t_2, a_2) = S_{t_1}^*$.

In Equation 39, as can be seen from the first symbol of the sequence I(j, $\mathcal{T}_2$), it can be recognized that the pair of timeslot indexes is (1,8) and the antenna index is (1,2). The elements of the Tx symbol ($\hat{S}_{j,k}$) may be determined to be $\hat{S}_{j,k}(1,1) = S_1$, $\hat{S}_{j,k}(1,2) = S_8$, $\hat{S}_{j,k}(8,1) = -S_8^*$, and $\hat{S}_{j,k}(8,2) = S_1^*$. Other elements may also be determined according to the same principle. The set $\chi_H = \{\hat{H}_{j,1}, \hat{H}_{j,2}\}$ of the corresponding effective channel matrices may be shown in the following equation 41.

$$\hat{H}_{j,1} = \begin{bmatrix} h_1 & h_2 & & & & & & \\ h_2^* & -h_1^* & & & & & & \\ & & h_3 & h_4 & & & & \\ & & h_4^* & -h_3^* & & & & \\ & & & & h_5 & h_6 & & \\ & & & & h_6^* & -h_5^* & & \\ & & & & & & h_7 & h_8 \\ & & & & & & h_8^* & -h_8^* \end{bmatrix},$$

$$\hat{H}_{j,2} = \begin{bmatrix} h_1 & & & & & & & h_2 \\ & h_4 & & & & & & h_3 \\ & & h_7 & & & h_8 & & \\ & & & -h_5^* & h_6^* & & & \\ & & & h_6 & h_5 & & & \\ & & h_8^* & & & -h_7^* & & \\ & h_3^* & & & & & -h_4^* & \\ h_2^* & & & & & & & -h_1^* \end{bmatrix}$$
[Equation 41]

Two effective channel matrices of Equation 41 may indicate the mapping results based on $\hat{H}_j(t_1,t_1) = h(a_1)$, $\hat{H}_j(t_1,t_2) = h(a_2)$, $\hat{H}_j(t_2,t_1) = h(a_2)^*$ and $\hat{H}_j(t_2,t_2) = -h(a_1)^*$.

In this example, it can be recognized that the duplication elements between two Tx symbol matrices ($\hat{S}_{j,1}, \hat{S}_{j,2}$) are present. Likewise, the duplication element may also be present between two effective channel matrices ($\hat{H}_{j,1}, \hat{H}_{j,2}$). In order to recognize the data transmission method applied to two matrices ($\hat{S}_{j,1}, \hat{S}_{j,2}$), the probability of generating the sequence decoding error may be increased. Therefore, the sequence codebook may be constructed in a manner that no duplication element exists, or the method for reducing the probability of generating the error when the sequence used as the effective channel matrix is estimated is needed.

First of all, a method for constructing the sequence codebook in a manner that there is no duplication element between the effective channel matrices (or the Tx symbol matrices) will hereinafter be given. Whereas the probability of generating the error is at the lowest value, the number of sequences capable of being generated may be greatly limited. A maximum of $M_T$ sequences may be constructed. That is, the amount of information loaded on the sequence and then transmitted may be denoted by a maximum of $1/M_T \log_2 M_T$ bits per channel use. For convenience of description, it is assumed that $M_T = 8$ is used.

First of all, it is assumed that the timeslot sets are denoted by $\mathcal{T}_1 = (t_1, t_2), (t_3, t_4), (t_5, t_6), (t_7, t_8) \rightarrow (1,2), (3,4), (5,6), (7,8)$. If two different timeslot sets are considered, irrespective of other sets other than the above-mentioned timeslot sets, there is a duplication element between the effective channel matrices (or between the Tx symbol matrices). Therefore, the simplest timeslot set may be considered as described above, and the transmission time points of 8 Tx symbols may be determined as shown in the following equation 42.

$S_1, S_2 \rightarrow (t_1, t_2) = (1,2)$ $S_3, S_4 \rightarrow (t_3, t_4) = (3,4)$ $S_5, S_6 \rightarrow (t_5, t_6) = (5,6)$ $S_7, S_8 \rightarrow (t_7, t_8) = (7,8)$ [Equation 42]

The order of symbols to be transmitted according to lapse of time may be determined, and the antenna index to be used may be determined according to the Tx time. It is assumed that the set of antenna indexes (i.e., the antenna index set) is denoted by $\mathcal{A}_1 = \{(1,2), (3,4), (5,6), (7,8)\}$.

The sequences capable of being constructed in a manner that the constituent indexes of the sequence are not overlapped with each other may be limited to the following four sequences (①, ②, ③, ④). In addition, elements between the effective channel matrices (or the Tx symbol matrices) do not overlap with each other.

① (1,2),(3,4),(5,6),(7,8)

② (3,4),(1,2),(7,8),(5,6)

③ (5,6),(7,8),(3,4),(1,2)

④ (7,8),(5,6),(1,2),(3,4)

If the above-mentioned values are converted into sequences, the sequences are as follows.

① I(1,$\mathcal{T}_1$)=((1,2),(1,2)),((3,4),(3,4)),((5,6),(5,6)),((7,8),(7,8))

② I(2,$\mathcal{T}_1$)=((3,4),(1,2)),((1,2),(3,4)),((7,8),(5,6)),((5,6),(7,8))

③ I(3,$\mathcal{T}_1$)=((5,6),(1,2)),((7,8),(3,4)),((3,4),(5,6)),((1,2),(7,8))

④ I(4,$\mathcal{T}_1$)=((7,8),(1,2)),((5,6),(3,4)),((1,2),(5,6)),((3,4),(7,8))

In the above four cases, the Tx symbol matrices corresponding to (①, ②, ③, ④) and the effective channel matrices are shown in the following equations 43 to 46.

$$\begin{bmatrix} S_1 & S_2 \\ -S_2^* & S_1^* \\ & & S_3 & S_4 \\ & & -S_4^* & S_3^* \\ & & & & S_5 & S_6 \\ & & & & -S_5^* & S_3^* \\ & & & & & & S_7 & S_8 \\ & & & & & & -S_8^* & S_7^* \end{bmatrix} \rightarrow \quad \text{[Equation 43]}$$

$$\begin{bmatrix} h_1 & h_2 \\ h_2^* & -h_1^* \\ & & h_3 & h_4 \\ & & h_4^* & -h_3^* \\ & & & & h_5 & h_6 \\ & & & & h_6^* & -h_5^* \\ & & & & & & h_7 & h_8 \\ & & & & & & h_8^* & -h_8^* \end{bmatrix}$$

$$\begin{bmatrix} S_1 & S_2 \\ -S_2^* & S_1^* \\ S_3 & S_4 \\ -S_4^* & S_3^* \\ & & S_5 & S_6 \\ & & -S_5^* & S_3^* \\ & & S_7 & S_8 \\ & & -S_8^* & S_7^* \end{bmatrix} \rightarrow \quad \text{[Equation 44]}$$

$$\begin{bmatrix} h_3 & h_4 \\ h_4^* & -h_3^* \\ h_1 & h_2 \\ h_2^* & -h_1^* \\ & & h_7 & h_8 \\ & & h_8^* & -h_8^* \\ & & h_5 & h_6 \\ & & h_6^* & -h_5^* \end{bmatrix}$$

$$\begin{bmatrix} S_1 & S_2 \\ -S_2^* & S_1^* \\ S_3 & S_4 \\ -S_4^* & S_3^* \\ S_5 & S_6 \\ -S_5^* & S_3^* \\ S_7 & S_8 \\ -S_8^* & S_7^* \end{bmatrix} \rightarrow \quad \text{[Equation 45]}$$

$$\begin{bmatrix} h_5 & h_6 \\ h_6^* & -h_5^* \\ h_7 & h_8 \\ h_8^* & -h_8^* \\ h_3 & h_4 \\ h_4^* & -h_3^* \\ h_1 & h_2 \\ h_2^* & -h_1^* \end{bmatrix}$$

$$\begin{bmatrix} & & S_1 & S_2 \\ & & -S_2^* & S_1^* \\ & & S_3 & S_4 \\ & & -S_4^* & S_3^* \\ S_5 & S_6 \\ -S_5^* & S_3^* \\ & & S_7 & S_8 \\ & & -S_8^* & S_7^* \end{bmatrix} \rightarrow \quad \text{[Equation 46]}$$

$$\begin{bmatrix} h_7 & h_8 \\ h_8^* & -h_8^* \\ & & h_5 & h_6 \\ & & h_6^* & -h_5^* \\ & & & & h_1 & h_2 \\ & & & & h_2^* & -h_1^* \\ & & & & & & h_3 & h_4 \\ & & & & & & h_4^* & -h_3^* \end{bmatrix}$$

Additional sequences are constructed using the above-mentioned scheme. The Alamouti block constructing the Tx symbol matrix shown in this example may correspond to the first one of two symbol patterns shown in Equation 19. The first symbol pattern may be changed to the second pattern shown in Equation 19. Values regarding i,j(i≠j) are shown in the following equation 47.

$$\begin{bmatrix} S_i & S_j \\ -S_j^* & S_i^* \end{bmatrix} \rightarrow \begin{bmatrix} S_j & S_i \\ S_i^* & -S_j^* \end{bmatrix}, \quad \text{[Equation 47]}$$

$$\forall i, \forall j \in \{1, 2, \ldots, M_T\}$$

The above-mentioned result may be defined by replacing the index positions with each other in each symbol (pair of indexes: index pair).

⑤ (2,1),(4,3),(6,5),(8,7)
⑥ (4,3),(2,1),(8,7),(6,5)
⑦ (6,5),(8,7),(4,3),(2,1)
⑧ (8,7),(6,5),(2,1),(4,3)

In the same manner as described above, $I(5,\mathcal{T}_1), I(6,\mathcal{T}_1), I(7,\mathcal{T}_1), I(8,\mathcal{T}_1)$ may also be shown.

The Tx symbol matrix corresponding to ⑤ and the effective channel matrix may be shown in the following equation 48.

Elements corresponding to the odd indexes may be replaced with elements corresponding to the even indexes. The same principles as in the case of ⑤ may also be applied to the other cases ⑥, ⑦, and ⑧.

$$\begin{bmatrix} S_2 & S_1 & & & & & & \\ S_1^* & -S_2^* & & & & & & \\ & & S_4 & S_3 & & & & \\ & & S_3^* & -S_4^* & & & & \\ & & & & S_6 & S_5 & & \\ & & & & S_5^* & -S_6^* & & \\ & & & & & & S_8 & S_7 \\ & & & & & & S_7^* & -S_8^* \end{bmatrix} \rightarrow$$ [Equation 48]

$$\begin{bmatrix} h_2 & h_1 & & & & & & \\ h_1^* & -h_2^* & & & & & & \\ & & h_4 & h_3 & & & & \\ & & h_3^* & -h_4^* & & & & \\ & & & & h_6 & h_5 & & \\ & & & & h_5^* & -h_6^* & & \\ & & & & & & h_8 & h_7 \\ & & & & & & h_7^* & -h_7^* \end{bmatrix}$$

In conclusion, the number of sequences capable of being constructed in this example may be 8. In association with $M_T$, $M_T$ sequences may be constructed in the same manner as in the case of 8 sequences.

Many more sequences must be constructed so as to load much more data on the sequence. However, it is very difficult to avoid duplication of elements between the effective channel matrices. A method for constructing sequences in consideration of the degree of index duplication between the sequences will hereinafter be given, and a reference for deciding the sequences will hereinafter be described with reference to the sequence construction method.

In more detail, a reference for deciding the sequence codebook based on the number of necessary sequences in consideration of the Hamming distance between the sequences will hereinafter be given. In addition, a phase rotation method of Tx symbol matrices corresponding to the sequence codebook so as to reduce the probability of generating the error between the sequences will hereinafter be given.

When the symbol is transmitted during the timeslot $M_T$, a total number of timeslot sets is $M_T/2$. If $M_T=8$ is given, the timeslot sets can be constructed as represented by the following table 3. The following table 3 satisfies all the limitation conditions defined in Equation 32.

TABLE 3

| Timeslot Set | | | | |
|---|---|---|---|---|
| $T_1$ | (1, 2) | (3, 4) | (5, 6) | (7, 8) |
| $T_2$ | (1, 8) | (7, 2) | (5, 4) | (3, 6) |
| $T_3$ | (1, 6) | (3, 2) | (5, 8) | (7, 4) |
| $T_4$ | (1, 4) | (5, 2) | (3, 8) | (7, 6) |

In Table 3, each timeslot set is denoted by (odd number, even number), and it can be recognized that the timeslot sets, each of which includes the value of 1, are composed of (1,2), (1,4), (1,6), and (1,8). Not only the value of 1, but also other indexes may achieve one pair composed of four indexes, such that the above-mentioned sets can be constructed. The above-mentioned sets in association with $M_T$ can also be searched for in the same manner as described above.

In addition, if $M_T=8$ is given, a total of 14 antenna index sets can be constructed as shown in the following equation 29. Excepting the scheme for excluding the symbol pattern from the above-mentioned one Alamouti block, a total of 7 antenna index sets corresponding to of $\mathcal{A}_1 \sim \mathcal{A}_7$ of the following table 4. The remaining 7 antenna index sets may be indicated by changing the order of indexes ($\mathcal{A}_1 \sim \mathcal{A}_7$), such that the 7 antenna index sets may be denoted by $\mathcal{A}_8 \sim \mathcal{A}_{14}$.

TABLE 4

| antenna index set | A | B | C | D |
|---|---|---|---|---|
| $\mathcal{A}_1$ | (1, 2) | (3, 4) | (5, 6) | (7, 8) |
| $\mathcal{A}_2$ | (1, 3) | (2, 4) | (5, 7) | (6, 8) |
| $\mathcal{A}_3$ | (1, 4) | (2, 5) | (3, 8) | (6, 7) |
| $\mathcal{A}_4$ | (1, 5) | (2, 6) | (3, 7) | (4, 8) |
| $\mathcal{A}_5$ | (1, 6) | (2, 3) | (5, 8) | (4, 7) |
| $\mathcal{A}_6$ | (1, 7) | (2, 8) | (3, 6) | (4, 5) |
| $\mathcal{A}_7$ | (1, 8) | (2, 7) | (3, 5) | (4, 6) |
| $\mathcal{A}_8$ | (2, 1) | (4, 3) | (6, 5) | (8, 7) |
| $\mathcal{A}_9$ | (3, 1) | (4, 2) | (7, 5) | (8, 6) |
| $\mathcal{A}_{10}$ | (4, 1) | (5, 2) | (8, 3) | (7, 6) |
| $\mathcal{A}_{11}$ | (5, 1) | (6, 2) | (7, 3) | (8, 4) |
| $\mathcal{A}_{12}$ | (6, 1) | (3, 2) | (8, 5) | (7, 4) |
| $\mathcal{A}_{13}$ | (7, 1) | (8, 2) | (6, 3) | (5, 4) |
| $\mathcal{A}_{14}$ | (8, 1) | (7, 2) | (5, 3) | (6, 4) |

Although the sequence can be composed of a total of 14 antenna index sets, it is assumed that the sequence is generated only using 8 antenna indexes ($\mathcal{A}_1 \sim \mathcal{A}_8$) so as to generate the amount of information on a bit basis for convenience of description and better understanding of the present invention. The following content may also be applied to the remaining antenna indexes ($\mathcal{A}_9 \sim \mathcal{A}_9$)

I. Sequence Codebook Design Based on Hamming Distance

The sequence codebook design based on the Hamming distance will hereinafter be described with reference to Table 3 and Table 4. First of all, the Hamming distance between two sequences may be used as a reference for defining the distance between two different sequences defined in the same timeslot set, and a detailed description thereof will hereinafter be described with reference to the following equation 49.

$$I(l, \mathcal{T}_k) = \underbrace{((l_1, l_2), (t_1, t_2))}_{symbol}, \ldots ,$$ [Equation 49]

$$\underbrace{((l_{M_T-1}, l_{M_T}), (t_{M_T-1}, t_{M_T}))}_{symbol}$$

$$I(i, \mathcal{T}_k) = \underbrace{((i_1, i_2), (t_1, t_2))}_{symbol}, \ldots ,$$

$$\underbrace{((i_{M_T-1}, i_{M_T}), (t_{M_T-1}, t_{M_T}))}_{symbol}$$

The l-th sequence and the i-th sequence may be represented by Equation 49. The constituent symbols of the sequence may be composed of the antenna index pair and the timeslot index pair as described above. Therefore, one symbol may be composed of 4 indexes, and may be defined as the same symbol only when the four indexes are identical to each other. The Hamming distance may be used to classify the sequences defined in the same timeslot set.

Assuming that the same symbols are located at the same positions within a total of $M_T/2$ symbol index pairs constructing the sequence, the Hamming distance may be set to 1. Otherwise, the Hamming distance may be set to zero '0'. The Hamming distance is calculated in associated with $M_T/2$ symbols, and the distance between the sequences may be denoted by a quantification number ($0 \sim M_T/2$) such that the sequences can be classified into various kinds of sequences.

1. The sequence codebook having a minimum Hamming distance $$\frac{M_T}{2}$$

between the sequences is constructed.

In the above-mentioned case, $$\frac{M_T}{2}$$

is a maximum Hamming distance between the sequences, and a total of $$\frac{M_T}{2}$$

sequences may be constructed in such a manner that symbols between the sequences do not overlap with each other using respective antenna index sets. Therefore, the sequence codebook having a minimum Hamming distance $$\left(\frac{M_T}{2}\right)$$

may be constructed to prevent the symbols from being overlapped.

For example, as can be seen from Table 4, various sequences ([A B C D], [B A D C], [C D A B], and [D C B A]), each of which has a minimum Hamming distance (4) between the sequences, may be constructed. The above-mentioned description relates to one antenna index set, and a total of 32 sequences may be constructed in association with 8 antenna index sets.

2. Thereafter, the sequence codebook having a minimum Hamming distance $$\frac{M_T}{2} - 1 (M_T \geq 6)$$

between the sequences may be constructed.

A total of $$\frac{M_T}{2}\left(\frac{M_T}{2} - 1\right) \times M_T$$

sequences may be constructed in such a manner that the symbols between the sequences do not overlap using respective antenna index sets. In more detail, one symbol may be fixed in the exemplary sequences shown in the above item (1), and each sequence may construct $$\frac{M_T}{2} - 1$$

different sequences. For example, Symbol A may be fixed, and three sequences may be constructed using 3 different symbols.

In Table 4, the sequence having a minimum Hamming distance of 3 may be constructed as follows. Therefore, a total of (4×3×8=12×8) sequences may be constructed.

[A B C D], [A D B C], [A C D B]
[D A C B], [C A B D], [B A D C]
[C D A B], [B C A D], [D B A C]
[C B D A], [B D C A], [D C B A]

3. Subsequently, the sequence codebook having a minimum Hamming distance $$\frac{M_T}{2} - 2 (M_T \geq 8)$$

between the sequences may be constructed. A total number of sequences, each of which has a minimum Hamming distance $$\frac{M_T}{2} - 2 (M_T \geq 8)$$

between the sequences, may be denoted by $$\frac{M_T}{2}\left(\frac{M_T}{2} - 1\right)\left(\frac{M_T}{2} - 2\right) \times M_T.$$

In more detail, in the case of using 12 sequences, each of which has a minimum distance $$\frac{M_T}{2} - 1,$$

two of constituent symbols of the sequence may be fixed, and additional sequences may be constructed one by one. That is, A and B from among [A B C D] may be fixed, and [A B D C] may be constructed.

For example, the sequences, each of which has the Hamming distance of 2 between the sequences, may be constructed on the basis of the antenna index sets ($\mathcal{A}_1 \sim \mathcal{A}_{14}$) of Table 4. Sequences denoted by bold lines may be defined in the above sequences, each of which has a minimum distance of 3 as shown in the above item (2). Specifically, A and B may be fixed, and the positions of C and D may be replaced with each other, so that other sequences can be constructed. In the above-mentioned case, a total of (4×3×2×8=24×8) sequences can be constructed.

[A B C D], [A B D C]
[A D B C], [A C B D]
[A C D B], [A D C B]
[D A C B], [C A D B]
[C A B D], [D A B C]
[B A D C], [B A C D]
[C D A B], [D C A B]
[B C A D], [B D A C]
[D B A C], [C B A D]
[C B D A], [D B C A]
[B D C A], [B C D A]
[D C B A], [C D B A]

The above-mentioned sequences may be mapped to a total of $$\frac{M_T}{2}$$

timeslot sets, such that a maximum of $$\frac{M_T}{2}! \times M_T \times \frac{M_T}{2}$$

index sequences may be generated.

In the meantime, as the number of overlap symbols on the basis of the Hamming distance is reduced, the characteristics in which the probability of error generation between the sequences is a low value can be reflected. However, although two symbols are different from each other, it may be difficult to actually reflect even the case in which the indexes constructing respective symbols are identical to each other. For example, in the case of using the symbols (1,2),(1,3), . . . ,(1,8), each symbol may include the index of 1. In addition, there is a need to decide the sequence codebook in consideration of all the antenna index sets of Table 4. In order to reflect the above characteristics, a method for generating the following codebook on the basis of the result obtained from the experiments will hereinafter be described.

All the sequences capable of being generated by the antenna index sets ($\mathcal{A}_1 \sim \mathcal{A}_{2M_T-2}$) are generated. In this case, it is assumed that the timeslot set is denoted by $\mathcal{T}_k$.

Thereafter, the pseudo Hamming distance between the index sequences may be calculated using the indexes between constituent pairs of the sequences, as shown in the following equation 50. For convenience of description, Equation 50 will hereinafter be described using the j-th sequence and the l-th sequence.

$I(i, \mathcal{T}_k) = ((y_1, y_2), (t_1, t_2)), \ldots, ((y_{M_T-1}, y_{M_T}), (t_{M_T-1}, t_{M_T}))$: i-th sequence $I(j, \mathcal{T}_k) = ((x_1, x_2), (t_1, t_2)), \ldots, ((x_{M_T-1}, x_{M_T}), (t_{M_T-1}, t_{M_T}))$: j-th sequence $d_{i,j}(k) = 0$, if $x_1 = y_1, x_2 = y_2$, where $k \in \{1, 2, \ldots, M_T/2\}$ $d_{i,j}(k) = \alpha, 0 < \alpha < 1$, if $x_1 = y_2, x_2 = y_1$, where $k \in \{1, 2, \ldots, M_2/2\}$ $d_{i,j}(k) = 1$, if $x_1 \neq y_1, x_2 \neq y_2$, where $k \in \{1, 2, \ldots, M_T/2\}$ Pseudo Hamming distance: $d_{i,j} = \Sigma_{k=1}^{0.5M_T} d_{i,j}(k)$.

$\max(d) = M_T/2$, [Equation 50]

Finally, the sequence codebook is generated using the following equation 51.

$$\mathcal{J} = \operatorname{argmax}\left[\min_{\forall i, \forall j \in \{1,2,\ldots,2^{B_{SSC}}\}} d_{i,j}\right],$$ [Equation 51]

where $\mathcal{J} \subseteq \{1, 2, \ldots, 2^{B_{SSC}}\}$.

As described above, the sequence codebook can be determined in such a manner that constituent indexes of the sequences do not maximally overlap with each other. In order to reduce the probability of error generation between the sequences in association with the overlapping of the sequence indexes, the effective channel matrix codebook (including the Tx symbol codebook corresponding to the effective channel matrix codebook) can be designed using the criterion capable of maximizing the minimum coding gain.

II. Tx Symbol Codebook Design and Effective Channel Matrix Codebook Design

The set (i.e., the effective channel codebook) of effective channel matrices corresponding to the sequence can be defined by the following equation 36. Specifically, a complex Gaussian channel may be assumed, and a minimum coding gain distance between the codewords may be defined by Equations 52 and 53. If the coding gain distance is maximized, the probability of error generation between the codewords can be greatly improved.

$$\varsigma(\hat{H}_{j_1,k_1}, \hat{H}_{j_2,k_2}) = \min_{j_1, j_2, k_1, k_2,} \det\left((\hat{H}_{j_1,k_1} - \hat{H}_{j_2,k_2})(\hat{H}_{j_1,k_1} - \hat{H}_{j_2,k_2})^H\right)$$ [Equation 52]

maximize $\varsigma(\hat{H}_{j_1,k_1}, \hat{H}_{j_2,k_2})$ [Equation 53]

However, it should be noted that there is no closed-form value in Equation 50 and Equation 51, so that the values for Equations 50 and 51 must be searched for through the experiments or tests. Needless to say, the search process may be achieved on the basis of the Tx symbol matrix instead of the effective channel matrix. In accordance with the present invention, a method for searching for the used channels is of importance, such that it is assumed that the channel is unchanged for a long time and the UE calculates a phase rotation angle and indicates the calculated result.

When the same elements are present between two matrices, elements corresponding to a difference between two matrices is set to zero '0', such that it can be recognized that the value of the matrix expression of Equation 52 is gradually reduced. When different effective channel matrices do not have the same elements, it can be recognized that the value of Equation 53 is equal to or higher than those of the other case in which different effective channel have the same elements.

A detailed description thereof will hereinafter be given.

First, as can be seen from Table 4, it is assumed that the sequence having the Hamming distance $$\frac{M_T}{2}$$

between the sequences is constructed using the antenna index sets ($\mathcal{A}_1 \sim \mathcal{A}_8$). As described above, if $M_T = 8$ is given, a total of 32 sequences may be constructed. Since the minimum distance is denoted by $$\frac{M_T}{2},$$

the overlap symbols and the overlap indexes are not present between the sequences generated by the same antenna set.

Although the constituent symbols of individual sequences composed of different antenna index sets are different from each other, some constituent indexes of the symbols may actually overlap with other. Therefore, in order to reduce the probability of error generation between the sequences using different antenna index sets, the sequences formed in the same antenna index set may rotate with the same phase as in Equation 54.

$$QPSK: \theta_k = \frac{(k-1)\pi}{16}, k = 1, 2, 3, 4, 5, 6, 7, 8 \quad \text{[Equation 54]}$$

$$BPSK: \theta_k = \frac{(k-1)\pi}{8}, k = 1, 2, 3, 4, 5, 6, 7, 8$$

That is, $\theta_k$ is multiplied by the sequence constructed using $\mathcal{A}_k$. If many more sequences are composed of the same antenna index sets, and if one sequence is mapped to another timeslot set, it is necessary for each sequence to be independently phase-rotated.

Then, the sequences may be mapped to all the timeslot sets of Table 3 such that the number of sequences may increase four times the number of sequences shown in the above case can be generated. In this case, an independent phase may be allocated to each antenna index set, and phase rotation may additionally be requisite for each timeslot set. If $M_T=8$ is given, phase rotation may be achieved as shown in Equation 55 and Equation 56.

$$QPSK: \theta_k = \frac{(k-1)\pi}{16}, k = 1, 2, 3, 4, 5, 6, 7, 8 \quad \text{[Equation 55]}$$

$$BPSK: \theta_k = \frac{(k-1)\pi}{8}, k = 1, 2, 3, 4, 5, 6, 7, 8$$

$\theta_k$ is a phase multiplied by the sequence generated by the k-th antenna index set.

$$\theta_l = \frac{(l-1)\pi}{2}, l = 1, 2, 3, 4, \quad \text{[Equation 56]}$$

$\theta_l$ is a phase multiplied by each sequence mapped to the l-th timeslot set. The timeslot set may be classified on the basis of $\pi/2$, and sequences located over each timeslot set may be classified within the range of $0 \sim \pi/2$.

Therefore, it can be recognized that the phase rotates in each timeslot as shown in the following equation 57.

$$\theta_{k,l} = \theta_k + \theta_l = \frac{(k-1)\pi}{16} + \frac{(l-1)\pi}{2} \quad \text{[Equation 57]}$$

In Table 4, the effective channel matrices corresponding to the index sequences $I(1,\mathcal{T}_1)=(1,2),(3,4),(5,6),(7,8)$ defined in $\mathcal{T}_1$ are shown in the following equation 58. $I(1,\mathcal{T}_4)=(1,2),(3,4),(5,6),(7,8)$ may be a block diagonal matrix comprised of 4 (2×2) Alamouti blocks.

$$\begin{bmatrix} h_1 & h_2 & & & & & & \\ -h_4^* & h_3^* & & & & & & \\ & & & & & & h_7 & h_8 \\ & & -h_6^* & h_5^* & & & & \\ & & h_5 & h_6 & & & & \\ & & & & & & -h_8^* & h_7^* \\ & & & & h_3 & h_4 & & \\ -h_2^* & h_1^* & & & & & & \end{bmatrix} \quad \text{[Equation 58]}$$

In addition, a maximum number of sequences may be generated using 8 antenna index sets.

In this case, the overlap symbol may also be present between the sequences constructed using the same antenna index set ($\mathcal{A}_k$). Therefore, although an independent phase is allocated to each antenna index set, insufficiency of sequences may occur, such that the independent phase is allocated to each sequence. As a result, a phase rotation unit may be very small in size. If the sequences are mapped to four timeslot sets ($\mathcal{T}_k$, k=1,2,3,4), the mapping results may also be classified on the basis of $\pi/2$ in the same manner as described above.

In more detail, a maximum number of sequences capable of being constructed using $\mathcal{A}_k$ is set to 24, such that (24×8=192) sequences may be generated using the sets ($\mathcal{A}_1 \sim \mathcal{A}_8$). In this case, phase rotation may be achieved as shown in the following equations 59 and 60.

$$QPSK: \theta_k = \frac{(k-1)\pi}{2 \times 192}, i = 1, 2, \ldots, 192 \quad \text{[Equation 59]}$$

$$BPSK: \theta_k = \frac{(k-1)\pi}{192}, i = 1, 2, \ldots, 192$$

$\theta_k$ is a phase multiplied by the sequence generated by the antenna index set $\mathcal{A}_k$.

$$\theta_l = \frac{(l-1)\pi}{2}, l = 1, 2, 3, 4, \quad \text{[Equation 60]}$$

$\theta_l$ is a phase multiplied by sequences mapped to the l-th timeslot set $\mathcal{T}_l = \{(t_1,t_2),(t_3,t_4), \ldots, (t_{M_T-1},t_{M_T})\}$. Therefore, phase rotation may be achieved as shown in the following equation 61.

$$\theta_{k,j} = \theta_k + \theta_j = \frac{(i-1)\pi}{2 \times 192} + \frac{(l-1)\pi}{2} \quad \text{[Equation 61]}$$

In the meantime, since the scheme proposed by the present invention requires joint decoding for $M_T/2$ data streams and the generated sequences, the operation processing ability of the UE configured to receive data needs to be considered. In addition, SNR equal to or higher than a predetermined level must be guaranteed, and the following content may be used considering the above-mentioned description.

The UE may transmit specific information indicating both CQI (channel quality indicator) information and the operation processing ability level (e.g., PAI (Processing Ability Indicator) reported at intervals of a very long time) to the base station (BS).

In this case, if the BS does not use the sequence codeword at a low-level CQI, and generates only a specific sequence having a relatively long Hamming distance at a high-level CQI and a low-level PAI and uses the specific sequence. However, at a high-level CQI and at a high-level PAI, sequences, each of which has a relatively short Hamming distance, are also considered according to the CQI, such that data can be transmitted using many more sequences.

If battery power of the remaining UE is insufficient, or if the UE desires to reduce the number of calculation times needed to receive RF data due to a high number of calculation times of a currently-used application, the UE may inform the BS of a low-level PAI. Therefore, the BS may reduce the number of calculation times of the UE by successively using the same pattern.

If the BS receives a low-level CQI due to a poor channel environment, the BS successively uses the same sequence so that BER performance of the UE may be deteriorated. In addition, when low-level CQI information is transmitted to the BS so as to reduce the amount of data per sequence, the same pattern is successively used so that the amount of information allocated to the sequence can be greatly reduced.

In addition, from among the sequences capable of being generated, one pattern may be used as the criterion or reference for changing the STBC-SSC Tx/Rx mode to the STBC mode. In more detail, if the BS transmits data using a predetermined pattern so as to reduce the number of calculation times, the UE recognizes that data has been transmitted several times using the same pattern, so that the STBC-SSC mode may be switched to the STBC mode. In addition, the pattern needed for mode switching from the STBC-SSC mode to the STBC mode may be used as the legacy STBC-SSC pattern. Alternatively, if the same pattern is repeatedly used a predetermined number of time or more, the UE may switch to the STBC mode without using additional signals.

In addition, UEs having similar CQI and PAI values are collected, so that the UEs may be used to transmit the broadcast signal on the basis of the same codebook. G As described above, the present invention provides the method for more effectively generating many more sequences than those of the sequence generation method shown in the legacy STBC-SSC scheme. In addition, although effective data segments transmitted for two timeslots are identical to each other when two data segments are transmitted using two equal space-time resources, the present invention can provide a method for identifying information according to the symbol pattern.

Since utilization of the space time resources is maximized and the symbol pattern is changed, the number of available sequences is greatly increased, and the criterion or reference for deciding the sequence codebook on the basis of the Hamming distance in consideration of similarity between constituent symbols of the sequence is shown in the present invention. In addition, the present invention provides the phase rotation criterion (or reference) for reducing the probability of error generation between the sequences.

FIG. 5 is a flow chart of a method for transmitting a signal to a receiver by a transmitter in a multiple input multiple output (MIMO) wireless communication system according to the embodiments of the present invention.

Referring to FIG. 5, The transmitter firstly generates at least two bit streams by channel-coding data, in S501.

Next, in S503, the transmitter may allocate a first bit stream having a specific size from among the bit streams to an antenna sequence codeword according to an antenna sequence codebook. Here, the antenna sequence codebook indicates a mapping relationship between the first bit stream and the antenna sequence codeword. Further, the antenna sequence codeword is defined by two timeslots and two antenna indexes.

Finally, the transmitter may transmit the remaining second bit stream from among the bit streams to the receiver according to an order of antenna pairs indicated by the allocated antenna sequence codeword, in S505.

Preferably, the method of FIG. 5 may comprise a step of constructing the antenna sequence codebook. Here, the antenna sequence codebook is constructed on the basis of a minimum Hamming distance between antenna sequences, and the minimum Hamming distance is decided according to a number of requisite sequences.

Preferably, the method of FIG. 5 may comprise steps of receiving operation processing ability information from the receiver and constructing the antenna sequence codebook on the basis of the operation processing ability information.

More preferably, the step of constructing the antenna sequence codebook may include, if the operation processing ability information is equal to or higher than a first threshold value, constructing the antenna sequence codebook on the basis of the minimum Hamming distance between antenna sequences of less than a second threshold value. Or, the step of constructing the antenna sequence codebook may include, if the operation processing ability information is less than a first threshold value, constructing the antenna sequence codebook on the basis of the minimum Hamming distance between antenna sequences of equal to or higher than a second threshold value.

As is apparent from the above description, the embodiments of the present invention can generate an efficient codebook for transmitting data in the MIMO wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a signal to a receiver by a transmitter in a multiple input multiple output (MIMO) wireless communication system, comprising:
generating at least two bit streams by channel-coding data;
allocating a first bit stream having a specific size from among the bit streams to an antenna sequence codeword according to an antenna sequence codebook; and
transmitting the remaining second bit stream from among the bit streams to the receiver according to an order of antenna pairs indicated by the allocated antenna sequence codeword,
wherein the antenna sequence codebook indicates a mapping relationship between the first bit stream and the antenna sequence codeword, and
the antenna sequence codeword is defined by two timeslots and two antenna indexes.

2. The method according to claim 1, further comprising:
constructing the antenna sequence codebook,
wherein the antenna sequence codebook is constructed on the basis of a minimum Hamming distance between antenna sequences, the minimum Hamming distance being decided according to a number of requisite sequences.

3. The method according to claim 1, further comprising:
receiving operation processing ability information from the receiver; and
constructing the antenna sequence codebook on the basis of the operation processing ability information.

4. The method according to claim 3, wherein the constructing the antenna sequence codebook includes:
if the operation processing ability information is equal to or higher than a first threshold value, constructing the antenna sequence codebook on the basis of the minimum Hamming distance between sequences of less than a second threshold value.

5. The method according to claim 3, wherein the constructing the antenna sequence codebook includes:
if the operation processing ability information is less than a first threshold value, constructing the antenna sequence codebook on the basis of the minimum Hamming distance between antenna sequences of equal to or higher than a second threshold value.

* * * * *